US00RE44705E

(19) United States
(12) Reissued Patent
Ihara et al.

(10) Patent Number: US RE44,705 E
(45) Date of Reissued Patent: Jan. 14, 2014

(54) ELECTROLYTIC SOLUTIONS AND BATTERY

(71) Applicant: Sony Corporation, Tokyo (JP)

(72) Inventors: Masayuki Ihara, Fukushima (JP); Hiroyuki Yamaguchi, Fukushima (JP); Tadahiko Kubota, Kanagawa (JP)

(73) Assignee: Sony Corporation, Tokyo (JP)

(21) Appl. No.: 13/757,379

(22) Filed: Feb. 1, 2013

Related U.S. Patent Documents

Reissue of:
(64) Patent No.: 8,241,795
Issued: Aug. 14, 2012
Appl. No.: 11/929,411
Filed: Oct. 30, 2007

(30) Foreign Application Priority Data

Dec. 8, 2006 (JP) ..... 2006-331998

(51) Int. Cl.
*H01M 6/16* (2006.01)
*H01M 10/0562* (2010.01)

(52) U.S. Cl.
USPC ..... 429/340; 429/322; 429/324

(58) Field of Classification Search
USPC ..... 429/340, 322, 324
See application file for complete search history.

(56) References Cited

U.S. PATENT DOCUMENTS

| | | | | | |
|---|---|---|---|---|---|
| 5,633,099 | A * | 5/1997 | Yokoyama et al. | ..... | 429/332 |
| 5,659,062 | A * | 8/1997 | Yokoyama et al. | ..... | 558/277 |
| 7,241,536 | B2 * | 7/2007 | Kim et al. | ..... | 429/340 |
| 7,255,966 | B2 * | 8/2007 | Kim et al. | ..... | 429/340 |
| 2007/0065727 | A1 * | 3/2007 | Koike et al. | ..... | 429/326 |

FOREIGN PATENT DOCUMENTS

| | | | | | |
|---|---|---|---|---|---|
| JP | 2002-008718 | * | 1/2002 | ..... | H01M 10/40 |
| JP | 3294400 | * | 4/2002 | ..... | H01M 10/40 |
| JP | 2002-359001 | * | 12/2002 | ..... | H01M 10/40 |

* cited by examiner

*Primary Examiner* — Helen O Conley
(74) *Attorney, Agent, or Firm* — K&L Gates LLP

(57) ABSTRACT

A battery capable of improving the storage characteristics and the cycle characteristics is provided. The battery includes a cathode, an anode, and an electrolytic solution. The electrolytic solution is impregnated in a separator provided between the cathode and the anode. A solvent of the electrolytic solution contains a given sulfone compound such as bis(trimethylsilyl)-2,2-difluorosulfoacetate. Compared to a case that a solvent does not contain the foregoing sulfone compound, the chemical stability of the electrolytic solution is improved, and the decomposition reaction of the electrolytic solution is suppressed.

43 Claims, 4 Drawing Sheets

ELECTROLYTIC SOLUTIONS AND BATTERY

Matter enclosed in heavy brackets [ ] appears in the original patent but forms no part of this reissue specification; matter printed in italics indicates the additions made by reissue.

CROSS REFERENCE TO RELATED APPLICATIONS

The present application claims priority to Japanese Patent Application JP 2006-331998 filed in the Japanese Patent Office on Dec. 8, 2006, the entire contents of which being incorporated herein by reference.

BACKGROUND

The present disclosure relates to an electrolytic solution containing a solvent and an electrolyte salt and a battery using the electrolytic solution.

In recent years, portable electronic devices such as combination cameras (videotape recorder), mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a secondary battery using insertion and extraction of lithium for charge and discharge reaction (so-called lithium ion secondary battery) or a secondary battery using precipitation and dissolution of lithium (so-called lithium metal secondary battery) is extremely prospective, since such a lithium ion secondary battery or such a lithium metal secondary battery can provide a higher energy density compared to a lead battery and a nickel cadmium battery.

In such a secondary battery, an electrolytic solution in which an electrolyte salt such as lithium hexafluorophosphate is dissolved in an ester carbonate solvent such as propylene carbonate and diethyl carbonate is widely used (for example, refer to Japanese Patent No. 3294400). In particular, for improving the load characteristics, the storage characteristics, the electrochemical characteristics and the like, an electrolytic solution containing, for example, an anhydride composed of sulfonic acid and carboxylic acid, sulfate having a trialkylsilyl group, sulfonate or the like is also used (for example, refer to Japanese Unexamined Patent Application Publication Nos. 2002-008718 and 2002-359001).

In the recent electronic devices, there is a tendency that the calorific value is more and more increased due to factors such as high performance of electronic parts typified by a CPU (central processing unit). Thus, the secondary battery is exposed in the high temperature atmosphere, and thereby the storage characteristics tend to be lowered. Furthermore, there is a tendency that the high performance and the multi-functions of the electronic devices are increasingly developed. Thus, there is a tendency that the discharge capacity is easily lowered by frequently repeating charge and discharge of the secondary battery. Therefore, it is aspired that the storage characteristics and the cycle characteristics of the secondary battery could be further improved.

Therefore, it is desirable to provide an electrolytic solution and a battery capable of improving the storage characteristics and the cycle characteristics.

SUMMARY

According to an embodiment, there is provided an electrolytic solution including a solvent containing a sulfone compound shown in Chemical formula 1 and an electrolyte salt.

Chemical formula 1

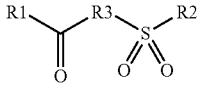

(R1 represents a halogen group, —O—R4, —S—R4, —O—$SiR5_3$, or —S—$SiR5_3$. R2 is a halogen group, —O—R6, —S—R6, —S—$SiR7_3$, or —O—$SiR7_3$. R3 is a bivalent group composed of carbon and an element selected from the group consisting of hydrogen, oxygen, and halogen. R4 and R6 are an alkyl group with the carbon number in the range from 1 to 4 or an alkyl halide group with the carbon number in the range from 1 to 4. R5 and R7 are an alkyl group with the carbon number in the range from 1 to 4, an alkylene group with the carbon number in the range from 1 to 4, or an aryl group. R4, R6, R5 and R7 may be identical or different.)

According to an embodiment, there is provided a battery including a cathode, an anode, and an electrolytic solution, wherein the electrolytic solution contains a solvent containing a sulfone compound shown in Chemical formula 1 and an electrolyte salt.

Chemical formula 1

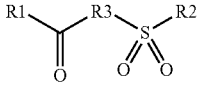

(R1 represents a halogen group, —O—R4, —S—R4, —O—$SiR5_3$, or —S—$SiR5_3$. R2 is a halogen group, —O—R6, —S—R6, —S—$SiR7_3$, or —O—$SiR7_3$. R3 is a bivalent group composed of carbon and an element selected from the group consisting of hydrogen, oxygen, and halogen. R4 and R6 are an alkyl group with the carbon number in the range from 1 to 4 or an alkyl halide group with the carbon number in the range from 1 to 4. R5 and R7 are an alkyl group with the carbon number in the range from 1 to 4, an alkylene group with the carbon number in the range from 1 to 4, or an aryl group. R4, R6, R5 and R7 may be identical or different.)

According to the electrolytic solution of the embodiment, the solvent contains the sulfone compound shown in Chemical formula 1. Thus, compared to a case in which the solvent does not contain the sulfone compound, the chemical stability is improved, and the decomposition reaction is suppressed when the electrolytic solution is used for an electrochemical device such as a battery. Thereby, in the battery using the electrolytic solution according to the embodiment of the invention, the storage characteristics and the cycle characteristics can be improved.

Other and further objects, features and advantages will appear more fully from the following description.

Additional features and advantages are described herein, and will be apparent from, the following Detailed Description and the figures.

DETAILED DESCRIPTION

Figure 1:
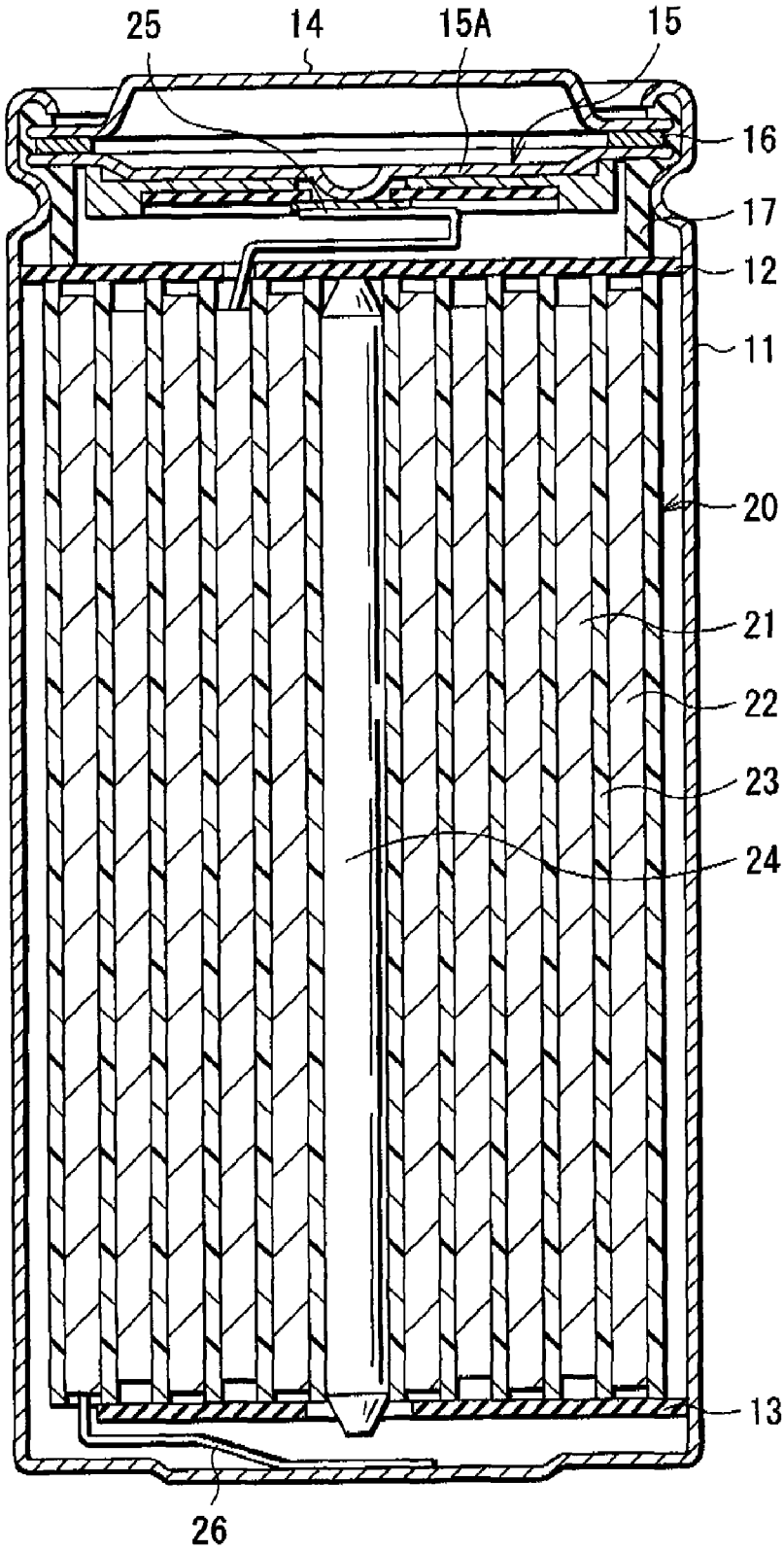
FIG. 1 is a cross section showing a structure of a first battery using an electrolytic solution according to an embodiment.

An embodiment will be hereinafter described in detail with reference to the drawings.

An electrolytic solution according to an embodiment is used for, for example, an electrochemical device such as a battery. The electrolytic solution according to the embodiment of the invention contains a solvent containing the sulfone compound shown in Chemical formula 1 and an electrolyte salt. Since the solvent contains the sulfone compound, the chemical stability is improved, and thus the decomposition reaction is prevented when the electrolytic solution is used for the electrochemical device. Thereby, the storage characteristics and the cycle characteristics in the electrochemical device are improved. The carbon number of R4 to R7 in Chemical formula 1 are in the range from 1 to 4, since thereby sufficient solubility can be obtained.

Chemical formula 1

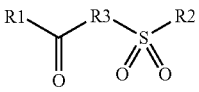

In the formula, R1 represents a halogen group, —O—R4, —S—R4, —O—$SiR5_3$, or —S—$SiR5_3$. R2 is a halogen group, —O—R6, —S—R6, —S—$SiR7_3$, or —O—$SiR7_3$. R3 is a bivalent group composed of carbon and an element selected from the group consisting of hydrogen, oxygen, and halogen. R4 and R6 are an alkyl group with the carbon number in the range from 1 to 4 or an alkyl halide group with the carbon number in the range from 1 to 4. R5 and R7 are an alkyl group with the carbon number in the range from 1 to 4, an alkylene group with the carbon number in the range from 1 to 4, or an aryl group. R4, R6, R5 and R7 may be identical or different.

The content of the sulfone compound shown in Chemical formula 1 in the electrolytic solution is preferably in the range from 0.01 wt % to 5 wt %, since thereby sufficient effects can be obtained.

The molecular weight of the sulfone compound shown in Chemical formula 1 is preferably in the range from 120 to 2000, more preferably in the range from 120 to 1000, and much more preferably in the range from 120 to 650. Thereby, sufficient effects can be obtained, and sufficient solubility can be obtained.

The halogen groups shown as R1 and R2 in Chemical formula 1 include, for example, a fluorine group (—F), a chlorine group (—Cl) and the like. It is needless to say that the halogen group may be a group other than the fluorine group and the chlorine group.

—$SiR5_3$ and —$SiR7_3$ respectively shown as R1 and R2 in Chemical formula 1 include, for example, —$Si(CH_3)_3$, —$Si(C_2H_5)_3$, —$Si(C_3H_7)_3$, —$Si(C_4H_9)_3$, —$Si(C_6H_5)_3$, —$Si(CH_3)_2(C_2H_5)$, —$Si(CH_3)(C_2H_5)_2$, —$Si(C_2H_5)(C_3H_7)_2$, —$Si(C_2H_5)_2(C_3H_7)$, —$Si(CH(CH_3)_2)_3$, —$Si(CH_3)(CH(CH_3)_2)_2$, —$Si(CH_3)_2(CH(CH_3)_2)$, —$Si(C_2H_5)(CH(CH_3)_2)_2$, —$Si(C_2H_5)_2(CH(CH_3)_2)$ and the like. It is needless to say that —$SiR5_3$ and —$SiR7_3$ are not limited to the foregoing groups, and —$SiR5_3$ and —$SiR7_3$ may be other group as long as such a group has the structure shown in Chemical formula 1.

R3 shown in Chemical formula 1 includes, for example, —$CH_2$—, —CHF—, —$CF_2$—, —C≡C, —$CH_2$—$CH_2$—, —$CF_2$—$CF_2$—, —$CH_2$—O—$CH_2$—, —$CF_2$—$CH_2$—$CF_2$—, —$CH_2$—$CH_2$—$CH_2$—, —$CF_2$—$CF_2$—$CF_2$—, —$CH_2$—$CH_2$—$CH_2$—$CH_2$—, —$CF_2$—$CH_2$—$CH_2$—$CF_2$—, —$CF_2$—$CF_2$—$CF_2$—$CF_2$—, —$C(CH_3)_2$—, —$C(C_2H_5)_2$—, —$C(C_3H_7)_2$—, —$C(CH_3)_2$—$C(CH_3)_2$—, —$CH_2$—$CH_2$—$C(CH_3)_2$—, —$CF_2$—$CH_2$—$C(CH_3)_2$—, —$C(CH_3)_2$—$CH_2$—$C(CH_3)_2$—, —$C(C_6H_5)_2$—$C(C_6H_5)_2$—, —$CF_2$—$CH_2$—$C(C_6H_5)_2$—, —$C(C_6H_5)_2$—$CH_2$—$C(C_6H_5)_2$— and the like. It is needless to say that R3 is not limited to the foregoing groups, and R3 may be other group as long as such a group has the structure shown in Chemical formula 1.

As an example of the sulfone compound shown in Chemical formula 1, the compounds shown in Chemical formulas 2, 3 and the like can be cited.

Chemical formula 2

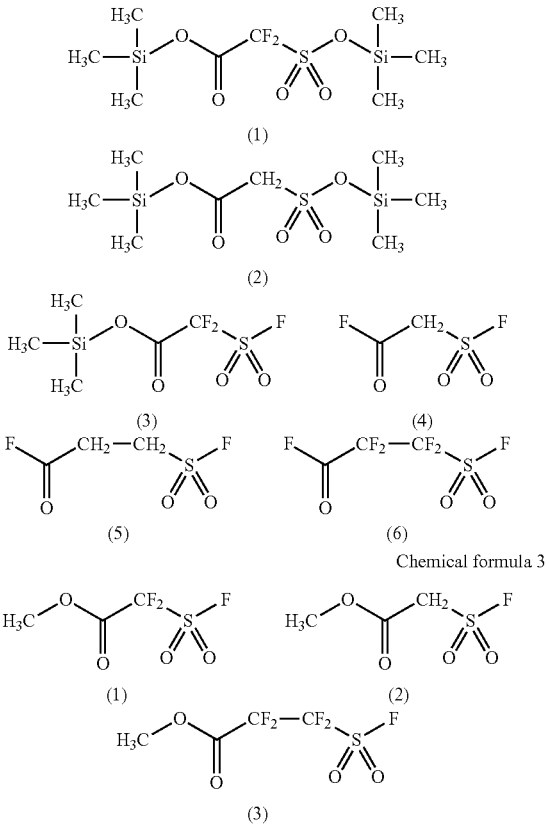

In addition, the sulfone compound shown in Chemical formula 1 includes, for example, difluorofluorosulfonyl acetyl fluoride, 3-fluorosulfonyl propionyl fluoride, 2,2,3,3-tetrafluoro-3-fluorosulfonyl propionyl fluoride, 4-fluorosulfonyl butyryl fluoride, 2,2,3,3,4,4-hexafluoro-4-fluorosulfonyl butyryl fluoride, trimethylsilyl-2-fluorosulfonyl acetate, triethylsilyl-2-fluorosulfonyl acetate, tripropylsilyl-2-fluorosulfonyl acetate, tributylsilyl-2-fluorosulfonyl acetate, triisopropylsilyl-2-fluorosulfonyl acetate, triethylsilyl-2,2-difluoro-2-fluorosulfonyl acetate, tripropylsilyl-2,2-difluoro-2-fluorosulfonyl acetate, tributylsilyl-2,2-difluoro-2-fluorosulfonyl acetate, triisopropylsilyl-2,2-difluoro-2-fluorosulfonyl acetate, trimethylsilyl-2,2-difluoro-2-fluorosulfonyl propionate, triethylsilyl-2,2-difluoro-2-fluorosulfonyl propionate, tripropylsilyl-2,2-difluoro-2-fluorosulfonyl propionate, tributylsilyl-2,2-difluoro-2-fluorosulfonyl propionate, triisopropylsilyl-2,2-difluoro-2-fluorosulfonyl propionate, trimethylsilyl-2,2-difluoro-2-fluorosulfonyl butyrate, triethylsilyl-2,2-difluoro-2-fluorosulfonyl butyrate, tripropylsilyl-2,2-difluoro-2-fluorosulfonyl butyrate, tributylsilyl-2,2-difluoro-2-fluorosulfonyl butyrate, triisopropylsilyl-2,2-difluoro-2-fluorosulfonyl butyrate, bis(triethylsilyl)sulfoacetate, bis(tripropylsilyl)sulfoacetate, bis(tributylsilyl)sulfoacetate, bis(triisopropylsilyl)sulfoacetate, bis(triethylsilyl)-2,2-difluorosulfoacetate, bis(tripropylsilyl)-2,2-difluorosulfoacetate, bis(tributylsilyl)-2,2-difluorosulfoacetate, bis(triisopropylsilyl)-2,2-difluorosulfoacetate, bis(trimethylsilyl)sulfopropionate, bis(triethylsilyl)sulfopropionate, bis(tripropylsilyl)sulfopropionate, bis(tributylsilyl)sulfopropionate, bis(triisopropylsilyl)sulfopropionate, bis(trimethylsilyl)-2,2,3,3-tetrafluorosulfopropionate, bis(triethylsilyl)-2,2,3,3-tetrafluorosulfopropionate, bis(tripropylsilyl)-2,2,3,3-tetrafluorosulfopropionate, bis(tributylsilyl)-2,2,3,3-tetrafluorosulfopropionate, bis(trimethylsilyl)sulfobutyrate, bis(triethylsilyl)sulfobutyrate, bis(tripropylsilyl)sulfobutyrate, bis(tributylsilyl)sulfobutyrate, bis(triisopropylsilyl)sulfobutyrate, bis(trimethylsilyl)-2,2,3,3,4,4-hexafluorosulfobutyrate, bis(triethylsilyl)-2,2,3,3,4,4-hexafluorosulfobutyrate, bis(tripropylsilyl)-2,2,3,3,4,4-hexafluorosulfobutyrate, bis(tributylsilyl)-2,2,3,3,4,4-hexafluorosulfobutyrate, bis(triisopropylsilyl)-2,2,3,3,4,4-hexafluorosulfobutyrate and the like.

One of the foregoing may be used singly, or two or more thereof may be used by mixing. Specially, as the sulfone compound shown in Chemical formula 1, at least one of the sulfone compounds shown in Chemical formulas 2 and 3 is preferable, since thereby sufficient effects can be obtained, and sufficient solubility can be obtained. It is needless to say that the sulfone compound is not limited to the foregoing compounds, and the sulfone compound may be other compound as long as such a compound has the structure shown in Chemical formula 1.

The solvent preferably contains, for example, cyclic ester carbonate having an unsaturated bond. Thereby, in the electrochemical device including the electrolytic solution, the decomposition reaction of the electrolytic solution can be further prevented. Accordingly, the storage characteristics and the cycle characteristics are further improved. As the cyclic ester carbonate having an unsaturated bond, for example, at least one selected from the group consisting of vinylene carbonate compounds, vinyl ethylene carbonate compounds, and methylene ethylene carbonate compounds can be cited.

The vinylene carbonate compound includes, for example, vinylene carbonate (1,3-dioxole-2-one), methyl vinylene carbonate (4-methyl-1,3-dioxole-2-one), ethyl vinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, 4-trifluoromethyl-1,3-dioxole-2-one and the like.

The vinyl ethylene carbonate compound includes, for example, vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, 4,5-divinyl-1,3-dioxolane-2-one and the like.

The methylene ethylene carbonate compound includes 4-methylene-1,3-dioxolane-2-one, 4,4-dimethyl-5-methylene-1,3-dioxolane-2-one, 4,4-diethyl-5-methylene-1,3-dioxolane-2-one and the like.

One of the foregoing may be used singly, or two or more thereof may be used by mixing. Specially, as the cyclic ester carbonate having an unsaturated bond, at least one selected from the group consisting of vinylene carbonate and vinyl ethylene carbonate is preferable, since thereby sufficient effects can be obtained. In this case, in particular, vinylene carbonate is more preferable than vinyl ethylene carbonate, since thereby higher effects can be obtained.

The solvent preferably contains at least one selected from the group consisting of chain ester carbonate having a halogen as an element shown in Chemical formula 4 and cyclic ester carbonate having a halogen as an element shown in Chemical formula 5. Thereby, in the electrochemical device including the electrolytic solution, a stable coat is formed on the electrode surface, and thus the decomposition reaction of the electrolytic solution is further suppressed. Accordingly, the storage characteristics and the cycle characteristics are more improved.

Chemical formula 4

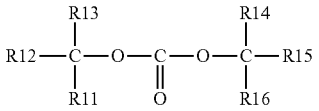

In the formula, R11 to R16 represent a hydrogen group, a halogen group, an alkyl group, or an alkyl halide group. R11 to R16 may be identical or different. However, at least one of R11 to R16 is the halogen group or the alkyl halide group.

Chemical formula 4

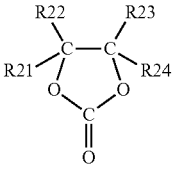

In the formula, R21 to R24 represent a hydrogen group, a halogen group, an alkyl group, or an alkyl halide group. R21 to R24 may be identical or different. However, at least one of R21 to R24 is the halogen group or the alkyl halide group.

The chain ester carbonate having a halogen as an element shown in Chemical formula 4 includes, for example, fluoromethyl methyl carbonate, bis(fluoromethyl) carbonate, difluoromethyl methyl carbonate and the like. One thereof may be used singly, or two or more thereof may be used by mixing.

The cyclic ester carbonate having a halogen as an element shown in Chemical formula 5 includes, for example, a compounds shown in Chemical formulas 6 and 7, that is, 4-fluoro-1,3-dioxolane-2-one in Chemical formula 6(1), 4-chloro-1,3-dioxolane-2-one in Chemical formula 6(2), 4,5-difluoro-1,3-dioxolane-2-one in Chemical formula 6(3), tetrafluoro-1,3-dioxolane-2-one in Chemical formula 6(4), 4-fluoro-5-chloro-1,3-dioxolane-2-one in Chemical formula 6(5), 4,5-dichloro-1,3-dioxolane-2-one in Chemical formula 6(6), tetrachloro-1,3-dioxolane-2-one in Chemical formula 6(7), 4,5-bistrifluoromethyl-1,3-dioxolane-2-one in Chemical formula 6(8), 4-trifluoromethyl-1,3-dioxolane-2-one in Chemical formula 6(9), 4,5-difluoro-4,5-dimethyl-1,3-dioxolane-2-one in Chemical formula 6(10), 4-methyl-5,5-difluoro-1,3-dioxolane-2-one in Chemical formula 6(11), 4-ethyl-5,5-difluoro-1,3-dioxolane-2-one in Chemical formula 6(12) and the like; and 4-trifluoromethyl-5-fluoro-1,3-dioxolane-2-one in Chemical formula 7(1), 4-trifluoromethyl-5-methyl-1,3-dioxolane-2-one in Chemical formula 7(2), 4-fluoro-4,5-dimethyl-1,3-dioxolane-2-one in Chemical formula 7(3), 4,4-difluoro-5-(1,1-difluoroethyl)-1,3-dioxolane-2-one in Chemical formula 7(4), 4,5-dichloro-4,5-dimethyl-1,3-dioxolane-2-one in Chemical formula 7(5), 4-ethyl-5-fluoro-1,3-dioxolane-2-one in Chemical formula 7(6), 4-ethyl-4,5-difluoro-1,3-dioxolane-2-one in Chemical formula 7(7), 4-ethyl-4,5,5-trifluoro-1,3-dioxolane-2-one in Chemical formula 7(8), 4-fluoro-4-methyl-1,3-dioxolane-2-one in Chemical formula 7(9) and the like. One thereof may be used singly, or two or more thereof may be used by mixing. Specially, as the cyclic ester carbonate having a halogen as an element, at least one selected from the group consisting of 4-fluoro-1,3-dioxolane-2-one and 4,5-difluoro-1,3-dioxolane-2-one is preferable, since these cyclic ester carbonates are easily available, and can provide sufficient effects. In this case, in particular, 4,5-difluoro-1,3-dioxolane-2-one is more preferable than 4-fluoro-1,3-dioxolane-2-one, since thereby higher effects can be obtained. More specifically, as 4,5-difluoro-1,3-dioxolane-2-one, a trans isomer is more preferable than a cis isomer to obtain higher effects.

Chemical formula 6

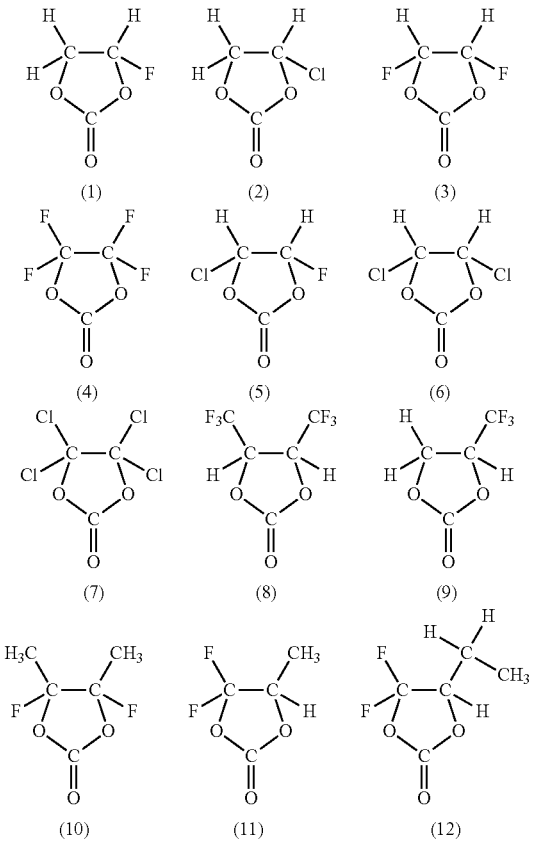

Chemical formula 7

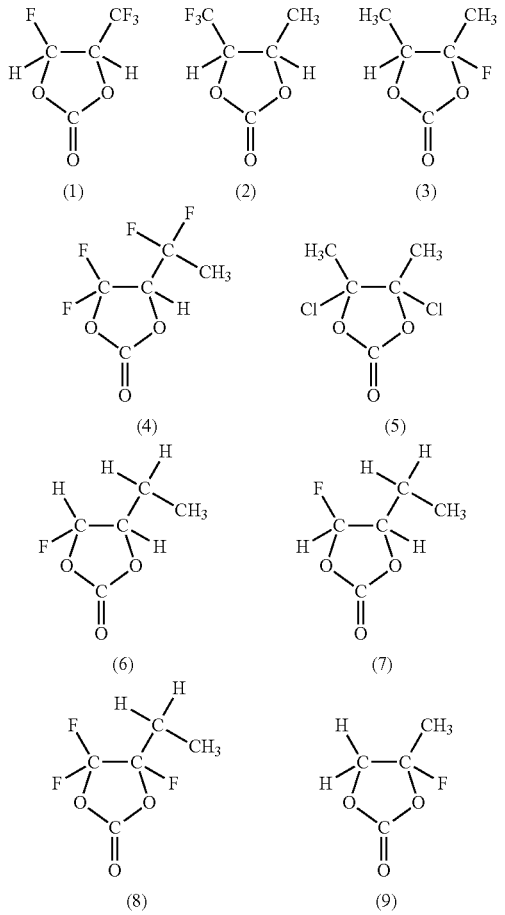

Further, the solvent preferably contains sultone (cyclic sulfonate) or an acid anhydride. Thereby, in the electrochemical device including the electrolytic solution, the decomposition reaction of the electrolytic solution is further suppressed. Accordingly, the storage characteristics and the cycle characteristics are further improved.

Sultone includes, for example, propane sultone, propene sultone and the like. One thereof may be used singly, or two or more thereof may be used by mixing. Specially, as the sultone, propene sultone is preferable. The content of the sultone in the electrolytic solution is preferably in the range from 0.5 wt % to 3 wt %. Thereby, sufficient effects can be obtained.

The acid anhydride includes, for example, succinic anhydride, glutaric anhydride, maleic anhydride, sulfobenzoic anhydride, sulfopropionic acid anhydride, sulfobutyric acid anhydride and the like. One thereof may be used singly, or two or more thereof may be used by mixing. Specially, as the acid anhydride, at least one selected from the group consisting of succinic anhydride and sulfobenzoic anhydride is preferable, since thereby sufficient effects can be obtained. In this case, in particular, sulfobenzoic anhydride is more preferable than succinic anhydride, since thereby higher effects can be obtained. The content of the acid anhydride in the electrolytic solution is preferably in the range from 0.5 wt % to 3 wt %, since thereby sufficient effects can be obtained.

The solvent may contain, for example, other solvent (for example, nonaqueous solvent such as an organic solvent) together with the foregoing sulfone compound shown in Chemical formula 1 or the like. Other solvents include, for example, ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, trimethyl methyl acetate, trimethyl ethyl acetate, acetonitrile, glutaronitrile, adiponitrile, methoxyacetonitrile, 3-methyoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, dimethyl sulfoxide, dimethyl sulfoxide phosphate and the like. One thereof may be used singly, or two or more thereof may be used by mixing. Specially, as other solvent, at least one selected from the group consisting of ethylene carbonate, propylene carbonate, dimethyl carbonate, diethyl carbonate, and ethyl methyl carbonate is preferable. Thereby, in the electrochemical device including the electrolytic solution, superior capacity characteristics, superior storage characteristics, and superior cycle characteristics can be obtained. In this case, in particular, the solvent preferably contains a mixture of a high-viscosity (high dielectric constant) solvent (for example, dielectric constant ∈≥30) such as ethylene carbonate and propylene carbonate and a low-viscosity solvent (for example, viscosity≤1 mPa□s) such as dimethyl carbonate, ethyl methyl carbonate, and diethyl carbonate. Thereby, the dissociation property of the electrolyte salt and the ion mobility are improved, and thus higher effects can be obtained.

The electrolyte salt preferably contains at least one selected from the group consisting of the compounds shown in Chemical formula 8, Chemical formula 9, and Chemical formula 10. Thereby, in the electrochemical device including the electrolytic solution, sufficient conductivity can be obtained stably, and thus the storage characteristics and the cycle characteristics are improved. One of the compound shown in Chemical formulas 8 to 10 may be used singly, or two or more thereof may be used by mixing.

Chemical formula 8

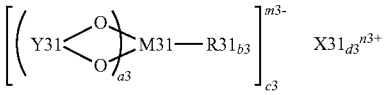

In the formula, X31 represents, a Group 1A element or a Group 2A element in the short period periodic table or aluminum. M31 represents a transition metal, a Group 3B element, a Group 4B element, or a Group 5B element in the short period periodic table. R31 represents a halogen group. Y31 represents —OC—R32-CO—, —OC—$CR33_2$—, or —OC—CO—. R32 represents an alkylene group, an alkylene halide group, an arylene group, or an arylene halide group. R33 represents an alkyl group, an alkyl halide group, an aryl group, or an aryl halide group, and may be identical or different. a3 represents one of integer numbers 1 to 4. b3 represents 0 or an integer number of 2 or 4. c3, d3, m3, and n3 represent one of integer numbers 1 to 3.

Chemical formula 9

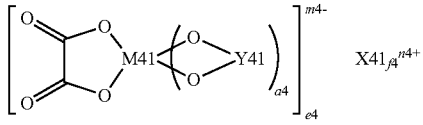

In the formula, X41 represents a Group 1A element or a Group 2A element in the short period periodic table. M41 represents a transition metal, a Group 3B element, a Group 4B element, or a Group 5B element in the short period periodic table. Y41 represents —OC—$(CR41_2)_{b4}$—CO—, —$R43_2C$—$(CR42_2)_{c4}$—CO—, —$R43_2C$—$(CR42_2)_{c4}$—$CR43_2$—, —$R43_2C$—$(CR42_2)_{c4}$—$SO_2$—, —$O_2S$—$(CR42_2)_{d4}$—$SO_2$—, or —OC—$(CR42_2)_{d4}$—$SO_2$—. R41 and R43 represent a hydrogen group, an alkyl group, a halogen group, or an alkyl halide group. R41 and R43 may be respectively identical or different. At least one of R41 and R43 is respectively the halogen group or the alkyl halide group. R42 represents a hydrogen group, an alkyl group, a halogen group, or an alkyl halide group, and may be identical or different. a4, e4, and n4 represent an integer number of 1 or 2. b4 and d4 represent one of integer numbers 1 to 4. c4 represents 0 or one of integer numbers 1 to 4. f4 and m4 represent one of integer numbers 1 to 3.

Chemical formula 10

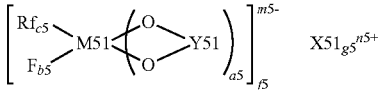

In the formula, X51 represents a Group 1A element or a Group 2A element in the short period periodic table. M51 represents a transition metal, a Group 3B element, a Group 4B element, or a Group 5B element in the short period periodic table. Rf represents a fluorinated alkyl group with the carbon number in the range from 1 to 10 or a fluorinated aryl group with the carbon number in the range from 1 to 10. Y51 represents —OC—$(CR51_2)_{d5}$—CO—, $R52_2C$—$(CR51_2)_{d5}$—CO—, —$R52_2C$—$(CR51_2)_{d5}$—$CR52_2$—, —$R52_2C$—$(CR51_2)_{d5}$—$SO_2$—, —$O_2S$—$(CR51_2)_{e5}$—$SO_2$—, or —OC—$(CR51_2)_{e5}$—$SO_2$—. R51 represents a hydrogen group, an alkyl group, a halogen group, or an alkyl halide group, and may be identical or different. R52 represents a hydrogen group, an alkyl group, a halogen group, or an alkyl halide group, may be identical or different, but at least one thereof is the halogen group or the alkyl halide group. a5, f5, and n5 represent an integer number of 1 or 2. b5, c5, and e5 represent one of integer numbers 1 to 4. d5 represents 0 or one of integer numbers 1 to 4. g5 and m5 represent one of integer numbers 1 to 3.

As an example of the compounds shown in Chemical formulas 8 to 10, the compounds shown in Chemical formulas 11 and 12 can be cited.

The compound shown in Chemical formula 8 includes, for example, difluoro[oxalate-O,O']lithium borate in Chemical formula 11(1), difluorobis[oxalate-O,O']lithium phosphate in Chemical formula 11(2), difluoro[3,3,3-trifluoro-2-oxide-2-trifluoromethyl propionate(2)-O,O']lithium borate in Chemical formula 11(3), bis[3,3,3-trifluoro-2-oxide-2-trifluoromethyl propionate(2-)-O,O']lithium borate in Chemical formula 11(4), tetrafluoro[oxalate-O,O']lithium phosphate in Chemical formula 11 (5), bis[oxalate-O,O']lithium borate in Chemical formula 11 (6) and the like.

The compound shown in Chemical formula 9 includes, for example, (2,2-difluoromalonate oxalate)lithium borate in Chemical formula 12(1), [bis(3,3,3-trifluoromethyl)glycolate oxalate]lithium borate in Chemical formula 12(2), (3,3,3-trifluoromethyl propionate oxalate)lithium borate in Chemical formula 12(3), (2-trifluoromethyl propionate oxalate)lithium borate in Chemical formula 12(4), (4,4,4-trifluoro-3-trifluoromethyl butyric acid oxalate)lithium borate in Chemical formula 12(5), (perfluoropinacolate oxalate)lithium borate in Chemical formula 12(6), (4,4,4-trifluoro-3-methyl butyric acid oxalate)lithium borate in Chemical formula 12(7), (4,4,4-trifluoro butyric acid oxalate) lithium borate in Chemical formula 12(8) and the like.

The compound shown in Chemical formula 10 includes, for example, fluorotrifluoromethyl[oxalate-O,O']lithium borate in Chemical formula 12(9) and the like.

One of the foregoing compounds may be used singly, or two or more thereof may be used by mixing. Specially, as the compounds shown in Chemical formulas 8 to 10, at least one selected from the group consisting of bis[oxalate-O,O'] lithium borate and [bis(3,3,3-trifluoromethyl)glycolate oxalate]lithium borate is preferable, since thereby sufficient effects can be obtained. It is needless to say that the compound is not limited to the compounds shown in Chemical formulas 11 and 12, and the compound may be other compound as long as such a compound has the structure shown in Chemical formulas 8 to 10.

Chemical formula 11

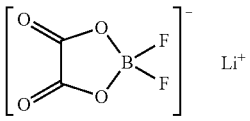

(1)

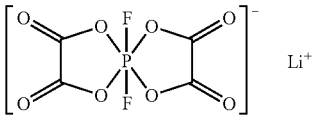

(2)

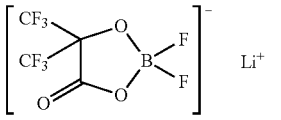

(3)

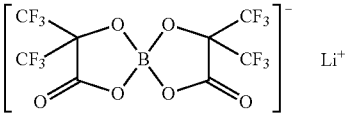

(4)

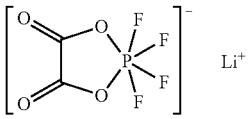

(5)

-continued

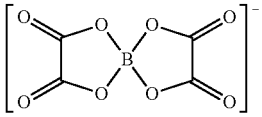

(6)

Chemical formula 12

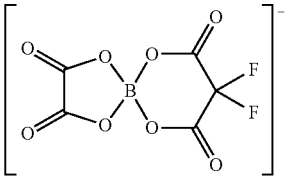

(1)

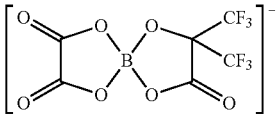

(2)

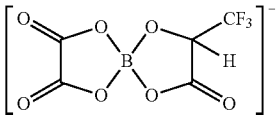

(3)

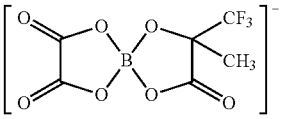

(4)

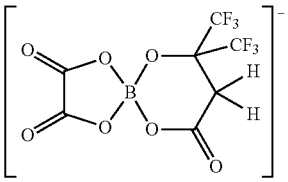

(5)

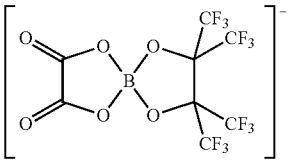

(6)

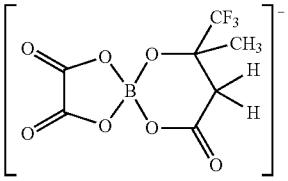

(7)

-continued

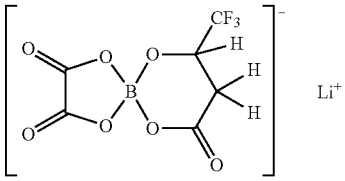

(8)

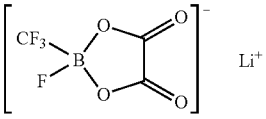

(9)

The electrolyte salt preferably contains, for example, other electrolyte salt together with the foregoing compound shown in Chemical formulas 8 to 10. Thereby, higher effects can be obtained. Other electrolyte salts include, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluosilicate ($Li_2SiF_6$), lithium chloride (LiCl), lithium bromide (LiBr) and the like. Such other electrolyte salt may be used singly, or two or more thereof may be used by mixing. Specially, as other electrolyte salt, at least one selected from the group consisting of lithium hexafluorophosphate, lithium tetrafluoroborate, lithium perchlorate, and lithium hexafluoroarsenate is preferable, since thereby sufficient effects can be obtained. In this case, lithium hexafluorophosphate is more preferable, since thereby the internal resistance is lowered, and thus higher effects can be obtained. In particular, when the electrolyte salt contains the foregoing compounds shown in Chemical formulas 8 to 10 together with lithium hexafluorophosphate, significantly high effects can be obtained.

The electrolyte salt preferably contains the compound shown in Chemical formula 13, Chemical formula 14, and Chemical formula 15. Thereby, sufficient effects can be obtained. One thereof may be used singly, or two or more thereof may be used by mixing. In particular, when the electrolyte salt contains at least one selected from the group consisting of the compounds shown in Chemical formulas 13 to 15 together with the foregoing lithium hexafluorophosphate or the like, or when the electrolyte salt contains the compounds shown in Chemical formulas 8 to 10 and Chemical formulas 13 to 15 together with lithium hexafluorophosphate or the like, significantly high effects can be obtained.

$$LiN(C_mF_{2m+1}SO_2)(C_nF_{2n+1}SO_2)$$ Chemical formula 13

In the formula, m and n represent an integer number of 1 or more. m and n may be identical or different.

Chemical formula 14

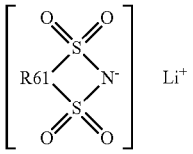

In the formula, R61 represents a straight chain or branched perfluoro alkylene group with the carbon number in the range from 2 to 4.

$$LiC(C_pF_{2p+1}SO^2)(C_qF_{2q+1}SO_2)(C_rF_{2r+1}SO_2)$$ Chemical formula 15

In the formula, p, q, and r represent an integer number of 1 or more. p, q, and r may be identical or different.

The chain compound shown in Chemical formula 13 includes, for example, lithium bis(trifluoromethanesulfonyl) imide ($LiN(CF_3SO_2)_2$), lithium bis(pentafluoroethanesulfonyl)imide ($LiN(C_2F_5SO_2)_2$), lithium (trifluoromethanesulfonyl)(pentafluoroethanesulfonyl)imide ($LiN(CF_3SO_2)(C_2F_5SO_2)$), lithium (trifluoromethanesulfonyl) (heptafluoropropanesulfonyl)imide ($LiN(CF_3SO_2)(C_3F_7SO_2)$), lithium (trifluoromethanesulfonyl) (nonafluorobutanesulfonyl)imide ($LiN(CF_3SO_2)(C_4F_9SO_2)$) and the like. One thereof may be used singly, or two or more thereof may be used by mixing.

The cyclic compound shown in Chemical formula 14 includes, for example, a compounds shown in Chemical formula 16, that is, lithium 1,2-perfluoroethanedisulfonylimide in Chemical formula 16(1), lithium 1,3-perfluoropropanedisulfonylimide in Chemical formula 16(2), lithium 1,3-perfluorobutanedisulfonylimide in Chemical formula 16(3), lithium 1,4-perfluorobutanedisulfonylimide in Chemical formula 16(4) and the like. One thereof may be used singly, or two or more thereof may be used by mixing. Specially, as the cyclic compound shown in Chemical formula 14 lithium 1,3-perfluoropropanedisulfonylimide is preferable, since thereby sufficient effects can be obtained.

Chemical formula 16

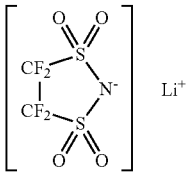

(1)

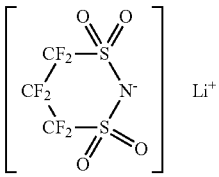

(2)

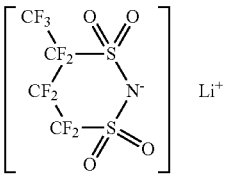

(3)

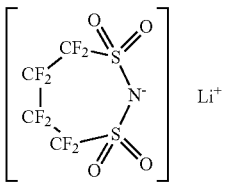

(4)

The chain compound shown in Chemical formula 15 includes, for example, lithium tris(trifluoromethanesulfonyl) methyde ($LiC(CF_3SO_2)_3$) and the like.

The content of the electrolyte salt is preferably in the range from 0.3 mol/kg to 3.0 mol/kg to the solvent. If the content is out of the foregoing range, there is a possibility that the ion conductivity is significantly lowered and thus sufficient capacity characteristics and the like are not able to be obtained in the electrochemical device including the electrolytic solution.

According to the electrolytic solution, the solvent contains the sulfone compound shown in Chemical formula 1. Therefore, compared to a case not containing the sulfone compound shown in Chemical formula 1, the chemical stability is improved, and the decomposition reaction is prevented when the electrolytic solution is used for an electrochemical device such as a battery. Thus, according to the electrolytic solution, the storage characteristics and the cycle characteristics are improved in the electrochemical device including the electrolytic solution. In this case, when the content of the sulfone compound shown in Chemical 1 in the electrolytic solution is in the range from 0.01 wt % to 5 wt %, sufficient effects can be obtained.

In particular, when the solvent contains the cyclic ester carbonate having an unsaturated bond, or when the solvent contains at least one selected from the group consisting of the chain ester carbonate having a halogen as an element shown in Chemical formula 4 and the cyclic ester carbonate having a halogen as an element shown in Chemical formula 5, higher effects can be obtained.

Further, when the electrolyte salt contains at least one selected from the group consisting of the compounds shown in Chemical formulas 8 to 10 and contains at least one selected from the group consisting of lithium hexafluorophosphate, lithium tetrafluoroborate, lithium perchlorate, and lithium hexafluoroarsenate, or when the electrolyte salt contains at least one selected from the group consisting of the compounds shown in Chemical formulas 13 to 15, still higher effects can be obtained.

Next, a description will be given of a usage example of the foregoing electrolytic solution. Taking a battery as an example of electrochemical devices, the electrolytic solution is used for the battery as follows.

First Battery

FIG. 1 shows a cross sectional structure of a first battery. The battery is a so-called lithium ion secondary battery in which the anode capacity is expressed by the capacity component based on insertion and extraction of lithium as an electrode reactant. FIG. 1 shows a battery structure of a so-called cylinder type secondary battery.

The secondary battery contains a spirally wound electrode body 20 in which a cathode 21 and an anode 22 are spirally wound with a separator 23 in between, and a pair of insulating plates 12 and 13 inside a battery can 11 in the shape of an approximately hollow cylinder. The battery can 11 is made of, for example, iron (Fe) plated by nickel (Ni). One end of the battery can 11 is closed, and the other end thereof is opened. The pair of insulating plates 12 and 13 is arranged to sandwich the spirally wound electrode body 20 in between and to extend perpendicularly to the spirally wound periphery face.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 through the PTC device 16. In the safety valve mechanism 15, when the internal pressure of the battery becomes a certain level or more by internal short circuit, external heating or the like, a disk plate 15A flips to cut the electric connection between the battery cover 14 and the spirally wound electrode body 20. When temperature rises, the PTC device 16 increases the resistance and thereby limits a current to prevent abnormal heat generation resulting from a large current. The gasket 17 is made of, for example, an insulating material and its surface is coated with asphalt.

For example, a center pin 24 is inserted in the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is electrically connected to the battery cover 14 by being welded to the safety valve mechanism 15. The anode lead 26 is welded and thereby electrically connected to the battery can 11.

Figure 2:
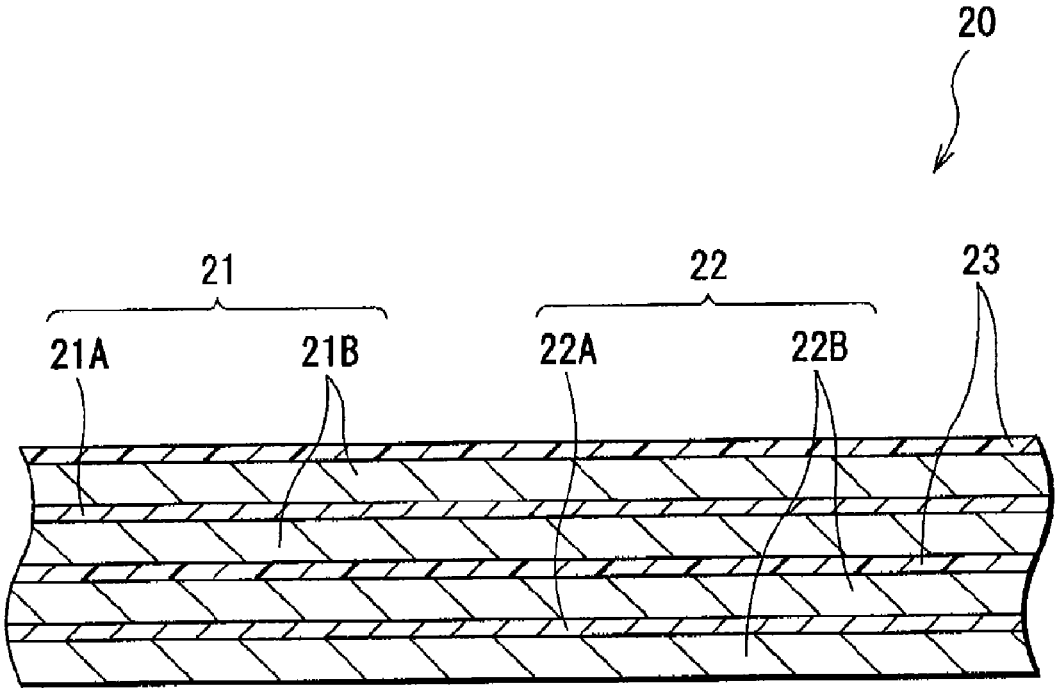
FIG. 2 is a cross section showing an enlarged part of a spirally wound electrode body shown in FIG. 1.

FIG. 2 shows an enlarged part of the spirally wound electrode body 20 shown in FIG. 1. The cathode 21 has a structure in which, for example, a cathode active material layer 21B is provided on the both faces of a cathode current collector 21A having a pair of opposed faces. The cathode current collector 21A is made of, for example, a metal material such as aluminum, nickel, and stainless. The cathode active material layer 21B contains, for example, as a cathode active material, one or more cathode materials capable of inserting and extracting lithium as an electrode reactant. If necessary, the cathode active material layer 21B may contain an electrical conductor, a binder and the like.

As the cathode material capable of inserting and extracting lithium, for example, a lithium complex oxide such as lithium cobalt oxide, lithium nickel oxide, a solid solution containing them ($Li(Ni_xCo_yMn_z)O_2$, values of x, y, and z are respectively expressed as $0<x<1$, $0<y<1$, $0<z<1$, and $x+y+z=1$), lithium manganese oxide having a spinel structure ($LiMn_2O_4$), and a solid solution thereof ($Li(Mn_{2-v}Ni_v)O_4$, a value of v is expressed as $v<2$); or a phosphate compound having an olivine structure such as lithium iron phosphate ($LiFePO_4$) is preferable. Thereby, a high energy density can be obtained. In addition to the foregoing, as the foregoing cathode material, for example, an oxide such as titanium oxide, vanadium oxide, and manganese dioxide; a disulfide such as iron disulfide, titanium disulfide, and molybdenum sulfide; sulfur; a conductive polymer such as polyaniline and polythiophene can be cited.

The anode 22 has a structure in which, for example, an anode active material layer 22B is provided on the both faces of an anode current collector 22A having a pair of opposed faces. The anode current collector 22A is preferably made of a material having the favorable electrochemical stability, the favorable electric conductivity, and the favorable mechanical strength. The anode current collector 22A is preferably made of, for example, a metal material such as copper (Cu), nickel, and stainless. Specially, the anode current collector 22A is preferably made of copper, since thereby high conductivity can be obtained. The anode active material layer 22B contains, for example, as an anode active material, one or more anode materials capable of inserting and extracting lithium. If necessary, the anode active material layer 22B may contain an electrical conductor, a binder and the like.

As the anode material capable of inserting and extracting lithium, for example, a carbon material can be cited. As the carbon material, for example, graphitizable carbon, non-graphitizable carbon in which the spacing of (002) plane is 0.37 nm or more, or graphite in which the spacing of (002) plane is 0.34 nm or less can be cited. More specifically, pyrolytic carbons, coke, graphite, glassy carbon fiber, an organic polymer compound fired body, carbon fiber, activated carbon, carbon black or the like can be cited. Of the foregoing, the coke includes pitch coke, needle coke, petroleum coke and the like. The organic polymer compound fired body is obtained by firing and carbonizing a phenol resin, a furan resin or the like at an appropriate temperature. In the carbon material, a change in the crystal structure due to insertion and extraction of lithium is very little. Therefore, by using the carbon material together with other anode material, a high energy density can be obtained and superior cycle characteristics can be obtained. In addition, the carbon material also functions as an electrical conductor, and thus the carbon material is preferably used.

In addition, as the anode material capable of inserting and extracting lithium, for example, a material that is capable of inserting and extracting lithium, and contains at least one of metal elements and metalloid elements as an element can be cited. Such an anode material is preferably used, since a high energy density can be thereby obtained. Such an anode material may be a simple substance, an alloy, or a compound of a metal element or a metalloid element, or may have one or more phases thereof at least in part. In an embodiment, alloys include an alloy containing one or more metal elements and one or more metalloid elements, in addition to an alloy including two or more metal elements. Further, an alloy in the invention may contain a nonmetallic element. The texture thereof includes a solid solution, a eutectic crystal (eutectic mixture), an intermetallic compound, and a texture in which two or more thereof coexist.

As such a metal element or such a metalloid element composing the anode material, for example, a metal element or a metalloid element capable of forming an alloy with lithium can be cited. Specifically, magnesium (Mg), boron (B), aluminum, gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt) and the like can be cited. Of the foregoing, at least one of silicon and tin is particularly preferable. Silicon and tin have the high ability to insert and extract lithium, and can provide a high energy density.

As an anode material containing at least one of silicon and tin, for example, the simple substance, an alloy, or a compound of silicon; the simple substance, an alloy, or a compound of tin; or a material having one or more phases thereof at least in part can be cited. One thereof may be used singly, or two or more thereof may be used by mixing.

As the alloy of silicon, for example, an alloy containing at least one selected from the group consisting of tin, nickel, copper, iron, cobalt (Co), manganese (Mn), zinc, indium, silver, titanium (Ti), germanium, bismuth, antimony (Sb), and chromium (Cr) as a second element other than silicon can be cited. As the alloy of tin, for example, an alloy containing at least one selected from the group consisting of silicon, nickel, copper, iron, cobalt, manganese, zinc, indium, silver, titanium, germanium, bismuth, antimony, and chromium as a second element other than tin can be cited.

As the compound of silicon or the compound of tin, for example, a compound containing oxygen or carbon can be cited. In addition to silicon or tin, the compound may contain the foregoing second element.

In particular, as the anode material containing at least one of silicon and tin, for example, an anode material containing a second element and a third element in addition to tin as a first element is also preferable. As the second element, at least one selected from the group consisting of cobalt, iron, magnesium, titanium, vanadium (V), chromium, manganese, nickel, copper, zinc, gallium, zirconium, niobium (Nb), molybdenum (Mo), silver, indium, cerium (Ce), hafnium, tantalum (Ta), tungsten (W), bismuth, and silicon is used. As the third element, at least one selected from the group consisting of boron, carbon, aluminum, and phosphorus is used. When the second element and the third element are contained, the cycle characteristics are improved.

Specially, as an anode material, a CoSnC-containing material that contains tin, cobalt, and carbon as an element, in which the carbon content is in the range from 9.9 wt % to 29.7 wt %, and the cobalt ratio to the total of tin and cobalt (Co/(Sn+Co)) is in the range from 30 wt % to 70 wt % is preferable. In such a composition range, a high energy density can be obtained, and superior cycle characteristics can be obtained.

The CoSnC-containing material may further contain other element according to needs. As other element, for example, silicon, iron, nickel, chromium, indium, niobium, germanium, titanium, molybdenum, aluminum, phosphorus, gallium, bismuth or the like is preferable. Two or more thereof may be contained, since thereby the capacity or the cycle characteristics can be further improved.

The CoSnC-containing material has a phase containing tin, cobalt, and carbon. Such a phase preferably has a low crystallinity structure or an amorphous structure. Further, in the CoSnC-containing material, at least part of carbon as an element is preferably bonded to a metal element or a metalloid element as other element. It is thought that lowering of cycle characteristics is caused by cohesion or crystallization of tin or the like. In this regard, when carbon is bonded to other element, such cohesion or crystallization can be prevented.

As a measurement method for examining bonding state of elements, for example, X-ray Photoelectron Spectroscopy (XPS) can be cited. In XPS, in the case of graphite, the peak of 1s orbit of carbon (C1s) is observed at 284.5 eV in the apparatus in which energy calibration is made so that the peak of 4f orbit of gold atom (Au4f) is obtained in 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the CoSnC-containing material is observed in the region lower than 284.5 eV, at least part of carbon contained in the CoSnC-containing material is bonded to the metal element or the metalloid element as other element.

In XPS, for example, the peak of C1s is used for correcting the energy axis of spectrums. Since surface contamination carbon generally exists on the surface, the peak of C1s of the surface contamination carbon is set to in 284.8 eV, which is used as an energy reference. In XPS, the waveform of the peak of C1s is obtained as a form including the peak of the surface contamination carbon and the peak of carbon in the CoSnC-containing material. Therefore, for example, the waveform is analyzed by using commercially available software to separate the peak of the surface contamination carbon and the peak of carbon in the CoSnC-containing material. In the analysis of the waveform, the position of the main peak existing on the lowest bound energy side is set to the energy reference (284.8 eV).

As the anode material capable of inserting and extracting lithium, for example, a metal oxide, a polymer compound and the like capable of inserting and extracting lithium can be cited. As the metal oxide, for example, iron oxide, ruthenium oxide, molybdenum oxide or the like can be cited. As the polymer compound, for example, polyacetylene, polyaniline, polypyrrole or the like can be cited.

It is needless to say that a mixture of the foregoing anode materials capable of inserting and extracting lithium may be used.

As the electrical conductor, for example, a carbon material such as graphite, carbon black, and Ketjen black can be cited. Such a carbon material may be used singly, or two or more thereof may be used by mixing. The electrical conductor may be a metal material, a conductive polymer or the like as long as the material has the conductivity.

As the binder, for example, a synthetic rubber such as styrene-butadiene rubber, fluorinated rubber, and ethylene propylene diene; or a polymer material such as polyvinylidene fluoride can be cited. One thereof may be used singly, or two or more thereof may be used by mixing. However, when the cathode 21 and the anode 22 are spirally wound as shown in FIG. 1, flexible styrene-butadiene rubber, flexible fluorinated rubber or the like is preferably used.

In the secondary battery, by adjusting the amount of the cathode active material and the amount of the anode active material, the charge capacity of the anode active material becomes larger than the charge capacity of the cathode active material, so that lithium metal is not precipitated on the anode 22 even when fully charged.

The separator 23 separates the cathode 21 from the anode 22, and passes lithium ions while preventing current short circuit due to contact of the both electrodes. The separator 23 is made of, for example, a porous film made of a synthetic resin such as polytetrafluoroethylene, polypropylene, and polyethylene, or a ceramics porous film. The separator 23 may have a structure in which two or more porous films as the foregoing porous films are layered. Specially, a polyolefin porous film is preferable since the polyolefin porous film has superior effects for preventing short circuit, and can contribute to improving battery safety by the shutdown effect. In particular, polyethylene is preferable since the shutdown effect can be obtained in the range from 100 deg C. to 160 deg C., and their electrochemical stability is superior. Polypropylene is also preferable. In addition, as long as a resin has the chemical stability, the resin may be used by being copolymerized or blended with polyethylene or polypropylene.

The foregoing electrolytic solution as a liquid electrolyte is impregnated in the separator 23. Thereby, superior storage characteristics and the superior cycle characteristics can be obtained.

The secondary battery can be manufactured, for example, as follows.

First, for example, the cathode 21 is formed by forming the cathode active material layer 21B on the both faces of the cathode current collector 21A. The cathode active material layer 21B is formed as follows. Cathode active material powder, an electrical conductor, and a binder are mixed to prepare a cathode mixture, which is dispersed in a solvent to obtain paste cathode mixture slurry. Then, the cathode current collector 21A is coated with the cathode mixture slurry, which is dried, and the resultant is compression-molded. Further, for example, according to a procedure similar to that of the cathode 21, the anode 22 is formed by forming the anode active material layer 22B on the both faces of the anode current collector 22A.

Subsequently, the cathode lead 25 is attached to the cathode current collector 21A by being welded, and the anode lead 26 is attached to the anode current collector 22A by being welded. Subsequently, the cathode 21 and the anode 22 are spirally wound with the separator 23 in between, and thereby the spirally wound electrode body 20 is formed. The end of the cathode lead 25 is welded to the safety valve mechanism 15, and the end of the anode lead 26 is welded to the battery can 11. After that, the spirally wound electrode body 20 is sandwiched between the pair of insulating plates 12 and 13, and contained inside the battery can 11. Subsequently, the electrolytic solution is injected into the battery can 11 and impregnated in the separator 23. Finally, at the open end of the battery can 11, the battery cover 14, the safety valve mechanism 15, and the PTC device 16 are fixed by being caulked with the gasket 17. The secondary battery shown in FIGS. 1 and FIG. 2 is thereby completed.

In the secondary battery, when charged, for example, lithium ions are extracted from the cathode 21 and inserted in the anode 22 through the electrolytic solution. Meanwhile, when discharged, for example, lithium ions are extracted from the anode 22, and inserted in the cathode 21 through the electrolytic solution.

According to the secondary battery, in the case that the capacity of the anode 22 is expressed by the capacity component based on insertion and extraction of lithium, the solvent of the electrolytic solution contains the sulfone compound shown in Chemical formula 1. Thus, the decomposition reaction of the electrolytic solution is suppressed. Therefore, the storage characteristics and the cycle characteristics can be improved.

Next, a description will be given of a second battery and a third battery. For the elements common to those of the first battery, the same referential symbols are affixed thereto, and the description thereof will be omitted.

Second Battery

The second battery has a structure, operations, and effects similar to those of the first battery except that the anode 22 has a different structure, and can be manufactured by a procedure similar to that of the first battery.

The anode 22 has a structure in which the anode active material layer 22B is provided on the both faces of the anode current collector 22A in the same manner as in the first battery. The anode active material layer 22B contains, for example, an anode active material containing silicon or tin as an element. Specifically, for example, the anode active material layer 22B contains the simple substance, an alloy, or a compound of silicon, or the simple substance, an alloy, or a compound of tin. The anode active material layer 22B may contain two or more thereof.

The anode active material layer 22B is formed by using, for example, vapor-phase deposition method, liquid-phase deposition method, spraying method, firing method, or two or more of these methods. The anode active material layer 22B and the anode current collector 22A are preferably alloyed at the interface thereof at least in part. Specifically, it is preferable that at the interface thereof, the element of the anode current collector 22A is diffused in the anode active material layer 22B, or the element of the anode active material layer 22B is diffused in the anode current collector 22A, or both elements are diffused therein each other. Thereby, deconstruction due to expansion and shrinkage of the anode active material layer 22B according to charge and discharge can be prevented, and electron conductivity between the anode active material layer 22B and the anode current collector 22A can be improved.

As vapor-phase deposition method, for example, physical deposition method or chemical deposition method can be cited. Specifically, vacuum deposition method, sputtering method, ion plating method, laser ablation method, thermal CVD (Chemical Vapor Deposition) method, plasma CVD method and the like can be cited. As liquid-phase deposition method, a known technique such as electrolytic plating and electroless plating can be used. Firing method is, for example, a method in which a particulate anode active material, a binder and the like are mixed and dispersed in a solvent, and then the anode current collector 22A is coated with the mixture, and the resultant is heat-treated at a temperature higher than the melting point of the binder and the like. For firing method, a known technique such as atmosphere firing method, reactive firing method, and hot press firing method can be cited.

Third Battery

The third battery is a lithium metal secondary battery in which the capacity of the anode 22 is expressed by the capacity component based on precipitation and dissolution of lithium. The secondary battery has a structure similar to that of the first battery, except that the anode active material layer 22B is made of lithium metal, and is manufactured in the same manner as that of the first battery.

In the secondary battery, the lithium metal is used as an anode active material. Thereby, a high energy density can be obtained. The anode active material layer 22B may exist in assembling. Otherwise, it is possible that the anode active material layer 22B does not exist in assembling, and is made of the lithium metal precipitated in charging. Otherwise, by using the anode active material layer 22B as a current collector, the anode current collector 22A may be omitted.

In the secondary battery, when charged, for example, lithium ions are extracted from the cathode 21, and precipitated as the lithium metal on the surface of the anode current collector 22A through the electrolytic solution. Meanwhile, when discharged, for example, the lithium metal is eluted as lithium ions from the anode active material layer 22B, and the lithium ions are inserted in the cathode 21 through the electrolytic solution.

According to this secondary battery, in the case that the capacity of the anode 22 is expressed by the capacity component based on precipitation and dissolution of lithium, the solvent of the electrolytic solution contains the sulfone compound shown in Chemical formula 1. Therefore, the storage characteristics and the cycle characteristics can be improved.

Fourth Battery

Figure 3:
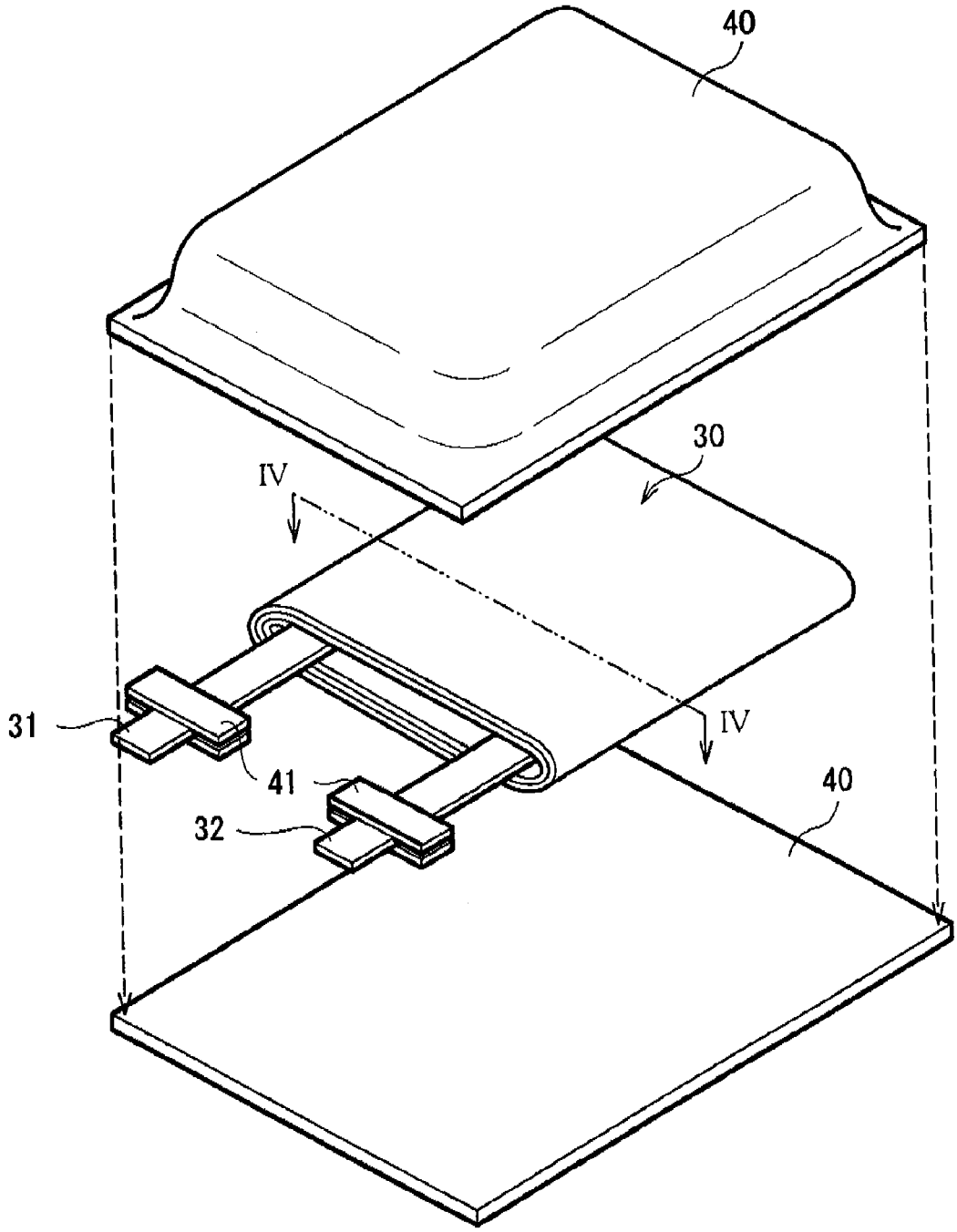
FIG. 3 is an exploded perspective view showing a structure of a forth battery using the electrolytic solution according to the embodiment.

FIG. 3 shows an exploded perspective structure of a fourth battery. In the battery, a spirally wound electrode body 30 on which a cathode lead 31 and an anode lead 32 are attached is contained inside a film package member 40. The battery structure is a so-called laminated type secondary battery.

The cathode lead 31 and the anode lead 32 are respectively directed from inside to outside of the package member 40 in the same direction, for example. The cathode lead 31 is made of, for example, a metal material such as aluminum. The anode lead 32 is made of, for example, a metal material such as copper, nickel, and stainless. The respective metal materials composing the cathode lead 31 and the anode lead 32 are in the shape of a thin plate or mesh.

The package member 40 is made of a rectangular aluminum laminated film in which, for example, a nylon film, an aluminum foil, and a polyethylene film are bonded together in this order. The package member 40 is, for example, arranged so that the polyethylene film and the spirally wound electrode body 30 are opposed, and the respective outer edges are contacted to each other by fusion bonding or an adhesive. An adhesive film 41 to protect from entering of outside air is inserted between the package member 40 and the cathode lead 31, the anode lead 32. The adhesive film 41 is made of a material having contact characteristics to the cathode lead 31 and the anode lead 32, for example, and is made of a polyolefin resin such as polyethylene, polypropylene, modified polyethylene, and modified polypropylene.

The package member 40 may be made of a laminated film having other structure, a polymer film such as polypropylene, or a metal film, instead of the foregoing three-layer aluminum laminated film.

Figure 4:
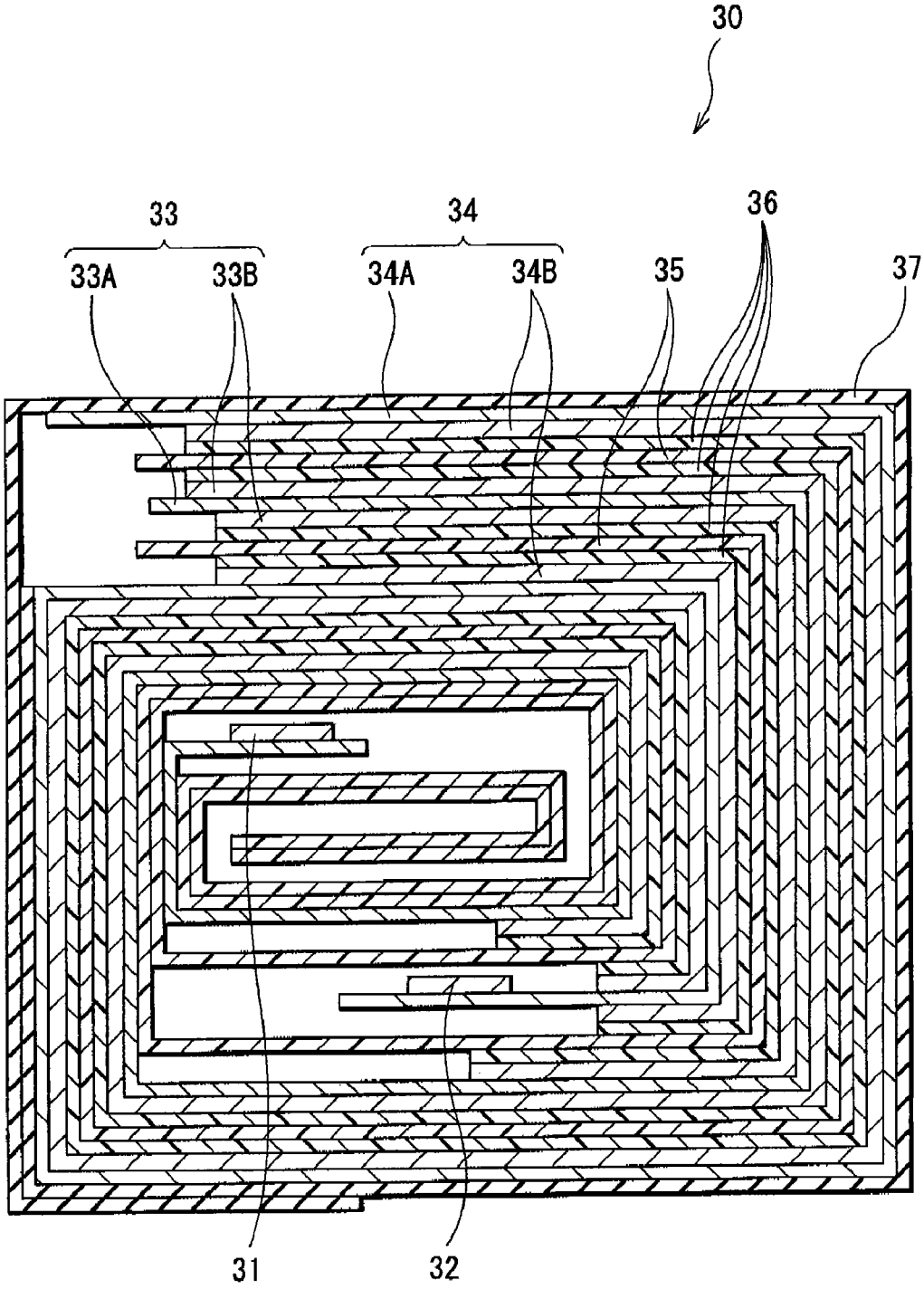
FIG. 4 is a cross section showing a structure taken along line IV-IV of a spirally wound electrode body shown in FIG. 3.

FIG. 4 shows a cross sectional structure taken along line IV-IV of the spirally wound electrode body 30 shown in FIG. 3. In the spirally wound electrode body 30, a cathode 33 and an anode 34 are layered with a separator 35 and an electrolyte 36 in between and then spirally wound. The outermost periphery thereof is protected by a protective tape 37.

The cathode 33 has a structure in which a cathode active material layer 33B is provided on the both faces of a cathode current collector 33A. The anode 34 has a structure in which an anode active material layer 34B is provided on the both faces of an anode current collector 34A. Arrangement is made so that the anode active material layer 34B is opposed to the cathode active material layer 33B. The structures of the cathode current collector 33A, the cathode active material layer 33B, the anode current collector 34A, the anode active material layer 34B, and the separator 35 are similar to those of the cathode current collector 21A, the cathode active material layer 21B, the anode current collector 22A, the anode active material layer 22B, and the separator 23 of the foregoing first and second batteries.

The electrolyte 36 is so-called gelatinous, containing the foregoing electrolytic solution and a polymer compound that holds the electrolytic solution. The gel electrolyte is preferable, since high ion conductivity (for example, 1 mS/cm or more at room temperature) can be obtained and liquid leakage of the battery can be prevented.

As the polymer compound, for example, polyacrylonitrile, polyvinylidene fluoride, a copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, polycarbonate or the like can be cited. One of these polymer compounds may be used singly, or two or more thereof may be used by mixing. In particular, in terms of electrochemical stability, polyacrylonitrile, polyvinylidene fluoride, polyhexafluoropropylene, polyethylene oxide or the like is preferably used. The addition amount of the polymer compound in the electrolytic solution varies according to the compatibility thereof, and for example, is preferably in the range from 5 wt % to 50 wt %.

The content of the electrolyte salt is similar to that of the first to the third batteries. However, in this case, the solvent means a wide concept including not only the liquid solvent but also a solvent having ion conductivity capable of dissociating the electrolyte salt. Therefore, when the polymer compound having ion conductivity is used, the polymer compound is also included in the solvent.

As the electrolyte 36, instead of the electrolyte in which the electrolytic solution is held by the polymer compound, the electrolytic solution may be directly used. In this case, the electrolytic solution is impregnated in the separator 35.

The secondary battery is manufactured, for example, as follows.

First, a precursor solution containing the electrolytic solution, a polymer compound, and a mixed solvent is prepared. Then, the cathode 33 and the anode 34 are respectively coated with the precursor solution. After that, the mixed solvent is volatilized to form the electrolyte 36. Subsequently, the cathode lead 31 is attached to the cathode current collector 33A, and the anode lead 32 is attached to the anode current collector 34A. Subsequently, the cathode 33 and the anode 34 formed with the electrolyte 36 are layered with the separator 35 in between to obtain a lamination. After that, the lamination is spirally wound in the longitudinal direction, the protective tape 37 is adhered to the outermost periphery thereof to form the spirally wound electrode body 30. Subsequently, for example, the spirally wound electrode body 30 is sandwiched between the package members 40, and outer edges of the package members 40 are contacted by thermal fusion bonding or the like to enclose the spirally wound electrode body 30. At this time, the adhesive film 41 is inserted between the cathode lead 31/the anode lead 32 and the package member 40. Thereby, the secondary battery shown in FIG. 3 and FIG. 4 is completed.

Otherwise, the secondary battery may be manufactured as follows. First, the cathode lead 31 and the anode lead 32 are respectively attached on the cathode 33 and the anode 34. After that, the cathode 33 and the anode 34 are layered with the separator 35 in between and spirally wound. The protective tape 37 is adhered to the outermost periphery thereof, and a spirally wound body as a precursor of the spirally wound electrode body 30 is formed. Subsequently, the spirally wound body is sandwiched between the package members 40, the peripheral edges other than one side are contacted by thermal fusion bonding or the like to obtain a pouched state, and the spirally wound body is contained inside the pouched-like package member 40. Subsequently, a composition of matter for electrolyte containing the electrolytic solution, a monomer as a raw material for a polymer compound, a polymerization initiator, and if necessary other material such as a polymerization inhibitor is prepared, which is injected into the pouched-like package member 40. After that, the opening of the package member 40 is hermetically sealed by, for example, thermal fusion bonding or the like. Finally, the monomer is thermally polymerized to obtain a polymer compound. Thereby, the gel electrolyte 36 is formed. Consequently, the secondary battery shown in FIG. 3 and FIG. 4 is completed.

The operations and the effects of the secondary battery are similar to those of the first or the second secondary battery described above.

EXAMPLES

Specific examples are described in detail.

First, with the use of artificial graphite as an anode active material, the laminated film secondary battery shown in FIG. 3 and FIG. 4 was fabricated. The secondary battery was fabricated as a lithium ion secondary battery in which the content of the anode 34 was expressed by the capacity component based on insertion and extraction of lithium.

Examples 1-1 to 1-4

First, the cathode 33 was formed. That is, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium cobalt complex oxide ($LiCoO_2$) was obtained. Subsequently, 91 parts by weight of the lithium cobalt complex oxide as a cathode active material, 6 parts by weight of graphite as an electrical conductor, and 3 parts by weight of polyvinylidene fluoride as a binder were mixed to obtain a cathode mixture. After that, the cathode mixture was dispersed in N-methyl-2-pyrrolidone to obtain paste cathode mixture slurry. Finally, the both faces of the cathode current collector 33A made of a strip-shaped aluminum foil (being 12 μm thick) were uniformly coated with the cathode mixture slurry, which was dried. After that, the resultant was compression-molded by a roll pressing machine to form the cathode active material layer 33B. After that, the cathode lead 31 made of aluminum was welded to one end of the cathode current collector 33A.

Subsequently, the anode 34 was formed. That is, 90 parts by weight of artificial graphite powder as an anode active material and 10 parts by weight of polyvinylidene fluoride as a binder were mixed to obtain an anode mixture. After that, the mixture was dispersed in N-methyl-2-pyrrolidone to obtain paste anode mixture slurry. The both faces of the anode current collector 34A made of a strip-shaped copper foil (being 15 μm thick) were uniformly coated with the anode mixture slurry, which was dried. After that, the resultant was compression-molded by a roll pressing machine to form the anode active material layer 34B. After that, the anode lead 32 made of nickel was welded to one end of the anode current collector 34A.

Subsequently, the cathode 33, the separator 35 made of a micro porous polypropylene film (being 25 μm thick), and the anode 34 were layered in this order. After that, the resultant lamination was spirally wound many times in the longitudinal direction, the end portion of the spirally wound body was fixed by a protective tape 37 made of an adhesive tape, and thereby a spirally wound body as a precursor of the spirally wound electrode body 30 was formed. Subsequently, the spirally wound body was inserted between the package members 40 made of a laminated film having three-layer structure (total thickness: 100 μm) in which nylon (being 30 μm thick), aluminum (being 40 μm thick), and non-stretched polypropylene (being 30 μm thick) were layered from the outside. After that, the outer edges other than the edge of one side of the package members 40 were thermally fusion-bonded to each other. Thereby, the spirally wound body was contained inside the package members 40 in a pouched state. Subsequently, the electrolytic solution was injected through the opening of the package member 40, the electrolytic solution as the electrolyte 36 was impregnated in the separator 35, and thereby the spirally wound electrode body 30 was formed.

For the electrolytic solution, a mixture of ethylene carbonate (EC), diethyl carbonate (DEC), and the sulfone compound shown in Chemical formula 2(1) as the sulfone compound shown in Chemical formula 1 was used as a solvent; and lithium hexafluorophosphate ($LiPF_6$) was used as an electrolyte salt. The mixture ratio of EC and DEC was EC:DEC=30:70 at a weight ratio. The content of the sulfone compound in the electrolytic solution was 0.01 wt % (Example 1-1), 1 wt % (Example 1-2), 3 wt % (Example 1-3), or 5 wt % (Example 1-4). The concentration of lithium hexafluorophosphate in the electrolytic solution was 1 mol/kg.

Finally, the opening of the package member 40 was thermally fusion-bonded and sealed in the vacuum atmosphere. Thereby, the laminated film type secondary battery was completed.

Examples 1-5 to 1-12

A procedure was performed in the same manner as that of Example 1-2, except that as the sulfone compound shown in Chemical formula 1, the sulfone compound shown in Chemical formula 2(2) (Example 1-5), the sulfone compound shown in Chemical formula 2(3) (Example 1-6), the sulfone compound shown in Chemical formula 2(4) (Example 1-7), the sulfone compound shown in Chemical formula 2(5) (Example 1-8), the sulfone compound shown in Chemical formula 2(6) (Example 1-9), the sulfone compound shown in Chemical formula 3(1) (Example 1-10), the sulfone compound shown in Chemical formula 3(2) (Example 1-11), or the sulfone compound shown in Chemical formula 3(3) (Example 1-12) was used instead of the sulfone compound shown in Chemical formula 2(1).

Examples 1-13 to 1-19

A procedure was performed in the same manner as that of Example 1-2, except that as a solvent, vinylene carbonate (VC: Example 1-13), vinyl ethylene carbonate (VEC: Example 1-14), 4-fluoro-1,3-dioxolane-2-one (FEC: Example 1-15), 4,5-difluoro-1,3-dioxolane-2-one (DFEC: Example 1-16), propene sultone (PRS: Example 1-17), succinic anhydride (SCAH: Example 1-18), or sulfobenzoic anhydride (SBAH: Example 1-19) was further added. The content of VC or the like in the electrolytic solution was 1 wt %.

Comparative Example 1-1

A procedure was performed in the same manner as that of Examples 1-1 to 1-4, except that the sulfone compound shown in Chemical formula 2(1) was not contained in the solvent.

Comparative Examples 1-2 to 1-5

A procedure was performed in the same manner as that of Examples 1-13, 1-15, 1-16, and 1-19, except that the sulfone compound shown in Chemical formula 2(1) was not contained in the solvent.

When the storage characteristics and the cycle characteristics of the secondary batteries of Examples 1-1 to 1-19 and Comparative examples 1-1 to 1-5 were examined, the results shown in Table 1 and Table 2 were obtained.

In examining the storage characteristics, the secondary battery was stored by the following procedure, and thereby the discharge capacity retention ratio was calculated. First, charge and discharge were performed 2 cycles in the atmosphere of 23 deg C., and thereby the discharge capacity at the second cycle (discharge capacity before storage) was measured. Subsequently, the secondary battery was stored in a constant temperature bath at 60 deg C. for 10 days in a state of being charged again. After that, discharge was performed in the atmosphere of 23 deg C., and thereby the discharge capacity at the third cycle (discharge capacity after storage) was measured. Finally, the discharge capacity retention ratio (%)=(discharge capacity after storage/discharge capacity before storage)×100 was calculated. The charge and discharge condition of 1 cycle was as follows. That is, after constant current and constant voltage charge was performed at the charge current of 0.2 C until the upper limit voltage of 4.2 V, constant current discharge was performed at the discharge current of 0.2 C until the final voltage of 2.5 V. "0.2 C" means the current value at which the theoretical capacity is completely discharged in 5 hours.

In examining the cycle characteristics, the secondary battery was repeatedly charged and discharged by the following procedure, and thereby the discharge capacity retention ratio was obtained. First, charge and discharge were performed 2 cycles in the atmosphere of 23 deg C., and thereby the discharge capacity at the second cycle was measured. Subsequently, the secondary battery was charged and discharged 50 cycles in a constant temperature bath at 45 deg C., and thereby the discharge capacity at the 50th cycle was measured. Finally, the discharge capacity retention ratio (%)=(discharge capacity at the 50th cycle at 45 deg C./discharge capacity at the second cycle at 23 deg C.)×100 was calculated. The charge and discharge condition of 1 cycle was similar to that of the case examining the storage characteristics.

The foregoing procedures, conditions and the like in examining the foregoing storage characteristics and the foregoing cycle characteristics were similarly applied for evaluating the same characteristics of the following examples and comparative examples.

TABLE 1

| Anode active material: artificial graphite | | | | | | | |
|---|---|---|---|---|---|---|---|
| | | Solvent | | | | Discharge capacity retention ratio (%) | |
| | Electrolyte | | Sulfone compound | | | Storage | Cycle |
| | salt | Type | Type | wt % | | characteristics | characteristics |
| Example 1-1 | $LiPF_6$ | EC + DEC — | Chemical | 0.01 | | 82 | 81 |
| Example 1-2 | 1.0 mol/kg | | formula | 1 | | 83 | 84 |
| Example 1-3 | | | 2(1) | 3 | | 85 | 85 |
| Example 1-4 | | | | 5 | | 85 | 84 |
| Example 1-5 | | | Chemical formula 2(2) | 1 | | 82 | 83 |
| Example 1-6 | | | Chemical formula 2(3) | | | 84 | 82 |
| Example 1-7 | | | Chemical formula 2(4) | | | 87 | 82 |
| Example 1-8 | | | Chemical formula 2(5) | | | 87 | 84 |
| Example 1-9 | | | Chemical formula 2(6) | | | 87 | 85 |
| Example 1-10 | | | Chemical formula 3(1) | | | 85 | 84 |

TABLE 1-continued

| Anode active material: artificial graphite | | | | | | | |
|---|---|---|---|---|---|---|---|
| | | Solvent | | | | Discharge capacity retention ratio (%) | |
| | Electrolyte | | Sulfone compound | | | Storage | Cycle |
| | salt | Type | Type | wt % | | characteristics | characteristics |
| Example 1-11 | | | Chemical formula 3(2) | | | 84 | 82 |
| Example 1-12 | | | Chemical formula 3(3) | | | 84 | 83 |
| Comparative example 1-1 | $LiPF_6$ 1.0 mol/kg | EC + DEC | — | — | | 81 | 80 |

TABLE 2

| Anode active material: artificial graphite | | | | | | | |
|---|---|---|---|---|---|---|---|
| | | Solvent | | | | Discharge capacity retention ratio (%) | |
| | Electrolyte | | | Sulfone compound | | Storage | Cycle |
| | salt | Type | | Type | wt % | characteristics | characteristics |
| Example 1-13 | $LiPF_6$ 1.0 mol/kg | EC + DEC | VC 1 wt % | Chemical formula 2(1) | 1 | 87 | 90 |
| Example 1-14 | | | VEC 1 wt % | | | 86 | 87 |
| Example 1-15 | | | FEC 1 wt % | | | 87 | 88 |
| Example 1-16 | | | DFEC 1 wt % | | | 88 | 90 |
| Example 1-17 | | | PRS 1 wt % | | | 93 | 83 |
| Example 1-18 | | | SCAH 1 wt % | | | 90 | 83 |
| Example 1-19 | | | SBAH 1 wt % | | | 92 | 84 |
| Comparative example 1-2 | $LiPF_6$ 1.0 mol/kg | EC + DEC | VC 1 wt % | — | — | 84 | 84 |
| Comparative example 1-3 | | | FEC 1 wt % | | | 82 | 82 |
| Comparative example 1-4 | | | DFEC 1 wt % | | | 85 | 85 |
| Comparative example 1-5 | | | SBAH 1 wt % | | | 82 | 81 |

As shown in Table 1, in Examples 1-1 to 1-4 in which the solvent contained the sulfone compound shown in Chemical formula 2(1), the discharge capacity retention ratios of the storage characteristics and the cycle characteristics were higher than those of Comparative example 1-1 in which the solvent did not contain the sulfone compound shown in Chemical formula 2(1). The lower limit and the upper limit of the content of the sulfone compound in the case that the foregoing result was obtained in Examples 1-1 to 1-4 were respectively 0.01 wt % and 5 wt %. Further, in Examples 1-5 to 1-12 in which the solvent contained the sulfone compound shown in Chemical formulas 2(2) to 2(6) or Chemical formula 3, the discharge capacity retention ratios of the storage characteristics and the cycle characteristics were higher than those in Comparative example 1-1 in which the solvent did not contain the sulfone compound shown in Chemical formulas 2(2) to 2(6) or Chemical formula 3. In the result, it was confirmed that in the secondary battery in which the anode active material contained artificial graphite, when the solvent of the electrolytic solution contained the sulfone compound shown in Chemical formula 1, the storage characteristics and the cycle characteristics were improved. It was also confirmed that in this case, the content of the sulfone compound shown in Chemical formula 1 in the electrolytic solution was preferably in the range from 0.01 wt % to 5 wt %.

Further, as shown in Table 1 and Table 2, in examples 1-13 to 1-19 in which the solvent contained VC, VEC, FEC, DFEC, PRS, SCAH, or SBAH, the discharge capacity retention ratio of the storage characteristics was higher than that of Example 1-2 in which the solvent did not contain VC, VEC, FEC, DFEC, PRS, SCAH, or SBAH, and the discharge capacity retention ratio of the cycle characteristics was almost equal to or more than that of Example 1-2. It is needless to say that in the case that when the solvent contained VC, FEC, DFEC, or SBAH, in Examples 1-13, 1-15, 1-16, and 1-19 in which the solvent contained the sulfone compound shown in Chemical formula 2(1), the discharge capacity retention ratios of the storage characteristics and the cycle characteristics were higher than those of Comparative examples 1-2 to 1-5 in which the solvent did not contain the sulfone compound shown in Chemical formula 2(1). Accordingly, it was confirmed that in the secondary battery in which the solvent of the electrolytic solution contained the sulfone compound shown in Chemical formula 1, when the solvent contained the cyclic ester carbonate having an unsaturated bond, the cyclic ester carbonate having a halogen as an element shown in Chemical formula 5, sultone, or acid anhydride, higher effects could be obtained. No examples have been herein disclosed for a case that the solvent contained the chain ester carbonate having a halogen as an element shown in Chemical formula 4. However, in terms of suppressing decomposition of the electrolytic solution, the chain ester carbonate having a halogen as an element shown in Chemical formula 4 has property similar to those of the cyclic ester carbonate having a halogen as an element shown in Chemical formula 5. Therefore, it is evident that in the case using the chain ester carbonate having a halogen as an element shown in Chemical formula 4, the foregoing effects can be also obtained.

In this case, in particular, when comparison between the respective discharge capacity retention ratios of the storage characteristics and the cycle characteristics was made based on every added solvent type, the following results were obtained. That is, for the cyclic ester carbonate having an unsaturated bond, the discharge capacity retention ratios in Example 1-13 containing VC were higher than those of Example 1-14 containing VEC. For the cyclic ester carbonate having a halogen as an element shown in Chemical formula 5, the discharge capacity retention ratios in Example 1-16 containing DFEC were higher than those of Example 1-15 containing FEC. For the acid anhydride, the discharge capacity retention ratios in Example 1-19 containing SBAH were higher than those of Example 1-18 containing SCAH. Accordingly, it was confirmed that VC was more preferably contained than VEC as the cyclic ester carbonate having an unsaturated bond, DFEC was more preferably contained than FEC as the cyclic ester carbonate having a halogen as an element shown in Chemical formula 5, and SBAH was more preferably contained than SCAH as the acid anhydride.

SBAH used in Comparative example 1-5 is a compound having both a sulfonyl group and a carbonyl group similarly to the sulfone compound shown in Chemical formula 1. In this case, in Comparative example 1-5 in which the solvent contained SBAH, the discharge capacity retention ratios of the storage characteristics and the cycle characteristics were higher than those in Comparative example 1-1 in which the solvent did not contain SBAH. Thus, SBAH presumably had a function to improve the storage characteristics and the cycle characteristics to no small extent. However, in Comparative example 1-5 in which the solvent contained SBAH, the discharge capacity retention ratios of the storage characteristics and the cycle characteristics were lower than those of Example 1-2 in which the solvent contained the sulfone compound shown in Chemical formula 1. This result shows that though SBAH had a function to improve the storage characteristics and the cycle characteristics, the effect thereof was inferior to the effect of the sulfone compound shown in Chemical formula 1. Accordingly, it was confirmed that in order to improve the storage characteristics and the cycle characteristics by making a solvent contain the compound having both the sulfonyl group and the carbonyl group, the sulfone compound shown in Chemical formula 1 was more preferable than SBAH.

Examples 2-1 to 2-4

A procedure was performed in the same manner as that of Example 1-2, except that as an electrolyte salt, lithium tetrafluoroborate ($LiBF_4$: Example 2-1), bis[oxalate-O,O'] lithium borate shown in Chemical formula 11(6) (Example 2-2), [bis(3,3,3-trifluoromethyl)glycolate oxalate]lithium borate shown in Chemical formula 12(2) (Example 2-3), or lithium 1,3-perfluoropropanedisulfonylimide shown in Chemical formula 16(2) (Example 2-4) was further added. The concentration of lithium hexafluorophosphate in the electrolytic solution was 0.9 mol/kg, and the concentration of lithium tetrafluoroborate or the like in the electrolytic solution was 0.1 mol/kg.

Example 2-5

A procedure was performed in the same manner as that of Example 1-2, except that as an electrolyte salt, bis[oxalate-O,O']lithium borate shown in Chemical formula 11(6) and lithium 1,3-perfluoropropanedisulfonylimide shown in Chemical formula 16(2) were further added. The concentration of lithium hexafluorophosphate in the electrolytic solution was 0.8 mol/kg, and the concentrations of bis[oxalate-O,O']lithium borate and lithium 1,3-perfluoropropanedisulfonylimide were respectively 0.1 mol/kg.

Comparative Example 2

A procedure was performed in the same manner as that of Example 2-2, except that the sulfone compound shown in Chemical formula 2(1) was not contained in the solvent.

For the secondary batteries of Examples 2-1 to 2-5 and Comparative example 2, the storage characteristics and the cycle characteristics were examined. The results shown in Table 3 were obtained. Table 3 also shows respective characteristics of Example 1-2 and Comparative example 1-1.

TABLE 3

| Anode active material: artificial graphite | | | | | | | |
|---|---|---|---|---|---|---|---|
| | Electrolyte salt | | Solvent | | | Discharge capacity retention ratio (%) | |
| | | | Type | Sulfone compound Type | Sulfone compound wt % | Storage characteristics | Cycle characteristics |
| Example 1-2 | $LiPF_6$ 1.0 mol/kg | | EC + DEC | Chemical formula 2(1) | 1 | 83 | 84 |
| Example 2-1 | $LiPF_6$ 0.9 mol/kg | $LiBF_4$ 0.1 mol/kg | | | | 85 | 83 |
| Example 2-2 | Chemical formula 11(6) 0.1 mol/kg | | | | | 85 | 88 |

TABLE 3-continued

| Anode active material: artificial graphite | | | | | | | |
|---|---|---|---|---|---|---|---|
| | Electrolyte salt | | Solvent | | | Discharge capacity retention ratio (%) | |
| | | | Type | Sulfone compound Type | Sulfone compound wt % | Storage characteristics | Cycle characteristics |
| Example 2-3 | | Chemical formula 12(2) 0.1 mol/kg | | | | 86 | 89 |
| Example 2-4 | | Chemical formula 16(2) 0.1 mol/kg | | | | 88 | 83 |
| Example 2-5 | $LiPF_6$ 0.8 mol/kg | Chemical formula 11(6) 0.1 mol/kg | Chemical formula 16(2) 0.1 mol/kg | | | 90 | 88 |
| Comparative Example 1-1 | | $LiPF_6$ 1.0 mol/kg | | EC + DEC | — | — | 81 | 80 |
| Comparative example 2 | $LiPF_6$ 0.9 mol/kg | Chemical formula 11(6) 0.1 mol/kg | | | | 84 | 82 |

As shown in Table 3, in Examples 2-1 to 2-5 in which the solvent contained the sulfone compound shown in Chemical formula 2(1), and the electrolyte salt contained lithium tetrafluoroborate, bis[oxalate-O,O']lithium borate, [bis(3,3,3-trifluoromethyl)glycolate oxalate]lithium borate, or lithium 1,3-perfluoropropanedisulfonylimide, the discharge capacity retention ratios of the storage characteristics and the cycle characteristics were higher than those of Comparative example 1-1 in which the solvent did not contain the sulfone compound shown in Chemical formula 2(1), and the electrolyte salt did not contain lithium tetrafluoroborate, bis[oxalate-O,O']lithium borate, [bis(3,3,3-trifluoromethyl)glycolate oxalate]lithium borate, or lithium 1,3-perfluoropropanedisulfonylimide. In Examples 2-1 to 2-5, the discharge capacity retention ratio of the storage characteristics was higher than that of Example 1-2 in which the electrolyte salt did not contain the foregoing lithium tetrafluoroborate and the like, and the discharge capacity retention ratio of the cycle characteristics was almost equal to or more than that of Example 1-2. It is needless to say that in the case that the electrolyte salt contained bis[oxalate-O,O']lithium borate, in Example 2-2 in which the solvent contained the sulfone compound shown in Chemical formula 2(1), the discharge capacity retention ratios of the storage characteristics and the cycle characteristics were higher than those of Comparative example 2 in which the solvent did not contain the sulfone compound shown in Chemical formula 2(1). Accordingly, it was confirmed that in the secondary battery in which the solvent of the electrolytic solution contained the sulfone compound shown in Chemical formula 1, when the electrolyte salt contained other electrolyte salt together with lithium hexafluorophosphate, the storage characteristics and the cycle characteristics were more improved.

In this case, in particular, focusing attention on the number of types of added electrolyte salts, in Example 2-5 in which 2 types of other electrolyte salts were added, the discharge capacity retention ratios of the storage characteristics and the cycle characteristics were higher than those in Examples 2-1 to 2-4 in which one type of other electrolyte salt was added. Accordingly, it was confirmed that two or more types of other electrolyte salts were preferably added in order to more improve the storage characteristics and the cycle characteristics.

Next, by using silicon as the anode active material, the laminated film type secondary battery shown in FIG. 3 and FIG. 4 was fabricated. The secondary battery was fabricated as a lithium ion secondary battery in which the capacity of the anode 34 was expressed by the capacity component based on insertion and extraction of lithium.

Examples 3-1 to 3-19

A procedure was performed in the same manner as that of Examples 1-1 to 1-19, except that the procedure for forming the anode 34 was different from that of Examples 1-1 to 1-19. When the anode 34 was formed, the anode active material layer 34B made of silicon was formed on the anode current collector 34A made of a copper foil (being 15 μm thick) by electron beam evaporation method.

Comparative Examples 3-1 to 3-5

A procedure was performed in the same manner as that of Comparative examples 1-1 to 1-5, except that the anode 34 was formed by the procedure similar to that of Examples 3-1 to 3-19.

For the secondary batteries of Examples 3-1 to 3-19 and Comparative examples 3-1 to 3-5, the storage characteristics and the cycle characteristics were examined. The results shown in Table 4 and Table 5 were obtained.

TABLE 4

| Anode active material: silicon | | | | | | | |
|---|---|---|---|---|---|---|---|
| | | Solvent | | | | Discharge capacity retention ratio (%) | |
| | Electrolyte | | Sulfone compound | | | Storage | Cycle |
| | salt | Type | Type | wt % | | characteristics | characteristics |
| Example 3-1 | $LiPF_6$ | EC + DEC | — | Chemical | 0.01 | 73 | 40 |
| Example 3-2 | 1 mol/kg | | | formula 2(1) | 1 | 80 | 65 |
| Example 3-3 | | | | | 3 | 79 | 67 |
| Example 3-4 | | | | | 5 | 78 | 67 |
| Example 3-5 | | | | Chemical formula 2(2) | 1 | 77 | 55 |
| Example 3-6 | | | | Chemical formula 2(3) | | 81 | 52 |
| Example 3-7 | | | | Chemical formula 2(4) | | 88 | 50 |
| Example 3-8 | | | | Chemical formula 2(5) | | 88 | 52 |
| Example 3-9 | | | | Chemical formula 2(6) | | 88 | 53 |
| Example 3-10 | | | | Chemical formula 3(1) | | 84 | 55 |
| Example 3-11 | | | | Chemical formula 3(2) | | 83 | 54 |
| Example 3-12 | | | | Chemical formula 3(3) | | 83 | 55 |
| Comparative Example 3-1 | $LiPF_6$ 1 mol/kg | EC + DEC | — | — | — | 70 | 30 |

TABLE 5

| Anode active material: silicon | | | | | | | |
|---|---|---|---|---|---|---|---|
| | | Solvent | | | | Discharge capacity retention ratio (%) | |
| | Electrolyte | | | Sulfone compound | | Storage | Cycle |
| | salt | Type | | Type | wt % | characteristics | characteristics |
| Example 3-13 | $LiPF_6$ 1 mol/kg | EC + DEC | VC 1 wt % | Chemical formula 2(1) | 1 | 84 | 69 |
| Example 3-14 | | | VEC 1 wt % | | | 81 | 68 |
| Example 3-15 | | | FEC 1 wt % | | | 82 | 70 |
| Example 3-16 | | | DFEC 1 wt % | | | 84 | 82 |
| Example 3-17 | | | PRS 1 wt % | | | 90 | 67 |
| Example 3-18 | | | SCAH 1 wt % | | | 88 | 68 |
| Example 3-19 | | | SBAH 1 wt % | | | 90 | 68 |
| Comparative example 3-2 | $LiPF_6$ 1 mol/kg | EC + DEC | VC 1 wt % | — | — | 75 | 62 |
| Comparative example 3-3 | | | FEC 1 wt % | | | 72 | 55 |
| Comparative example 3-4 | | | DFEC 1 wt % | | | 80 | 72 |
| Comparative example 3-5 | | | SBAH 1 wt % | | | 73 | 40 |

As shown in Table 4 and Table 5, when silicon was used as the anode active material, results almost similar to the results shown in Table 1 and Table 2 in the case of using artificial graphite were obtained.

That is, as shown in Table 4, in Examples 3-1 to 3-4 in which the solvent contained the sulfone compound shown in Chemical formula 2(1), when the lower limit and the upper limit of the content of the sulfone compound shown in Chemical formula 2(1) were respectively 0.01 wt % and 5 wt %, the discharge capacity retention ratios of the storage characteristics and the cycle characteristics were higher than those in Comparative example 3-1 in which the solvent did not contain the sulfone compound shown in Chemical formula 2(1). In Examples 3-5 to 3-12 in which the solvent contained the sulfone compound shown in Chemical formulas 2(2) to 2(6) or Chemical formula 3, the discharge capacity retention ratios of the storage characteristics and the cycle characteristics were higher than those in Comparative example 3-1 in which the solvent did not contain the sulfone compound shown in Chemical formulas 2(2) to 2(6) or Chemical formula 3. Accordingly, it was confirmed that in the secondary battery in which the anode active material contained silicon, when the solvent of the electrolytic solution contained the sulfone compound shown in Chemical formula 1, the storage characteristics and the cycle characteristics were improved. In addition, it was confirmed that in the secondary battery in which the anode active material contained silicon, the content of the sulfone compound shown in Chemical formula 1 in the electrolytic solution was preferably in the range from 0.01 wt % to 5 wt %.

Further, as shown in Table 4 and Table 5, in Examples 3-13 to 3-19 in which the solvent contained VC or the like, the discharge capacity retention ratios of the storage characteristics and the cycle characteristics were higher than those in Example 3-2 in which the solvent did not contain VC or the like. It is needless to say that in Examples 3-13 to 3-19 in which the solvent contained the sulfone compound shown in Chemical formula 2(1), the discharge capacity retention ratios of the storage characteristics and the cycle characteristics were higher than those in Comparative example 3-1 in which the solvent did not contain the sulfone compound shown in Chemical formula 2(1). Further, when the solvent contained VC or the like, in Examples 3-13, 3-15, 3-16, and 3-19 in which the solvent contained the sulfone compound shown in Chemical formula 2(1), the discharge capacity retention ratios of the storage characteristics and the cycle characteristics were higher than those in Comparative examples 3-2 to 3-5 in which the solvent did not contain the sulfone compound shown in Chemical formula 2(1). Accordingly, it was confirmed that in the secondary battery in which the solvent of the electrolytic solution contained the sulfone compound shown in Chemical formula 1, higher effects could be obtained when the solvent contained the cyclic ester carbonate having an unsaturated bond, the cyclic ester carbonate having a halogen as an element shown in Chemical formula 5, sultone, or the acid anhydride.

In this case, in particular, for the cyclic ester carbonate having an unsaturated bond, the discharge capacity retention ratios of the storage characteristics and the cycle characteristics in Example 3-13 containing VC were higher than those of Example 3-14 containing VEC. For the cyclic ester carbonate having a halogen as an element shown in Chemical formula 5, the discharge capacity retention ratios of the storage characteristics and the cycle characteristics in Example 3-16 containing DFEC were higher than those of Example 3-15 containing FEC. For the acid anhydride, the discharge capacity retention ratios of the storage characteristics and the cycle characteristics in Example 3-19 containing SBAH were higher than those of Example 3-18 containing SCAH. Accordingly, it was confirmed that to improve the storage characteristics and the cycle characteristics, VC was more preferable than VEC as the cyclic ester carbonate having an unsaturated bond, DFEC was more preferable than FEC as the cyclic ester carbonate having a halogen as an element shown in Chemical formula 5, and SBAH was more preferable than SCAH as the acid anhydride.

In Example 3-2 in which the solvent contained the sulfone compound shown in Chemical formula 1, the discharge capacity retention ratios of the storage characteristics and the cycle characteristics were higher than those in Comparative example 3-5 in which the solvent contained SBAH. Accordingly, it was confirmed that in order to improve the storage characteristics and the cycle characteristics by making the solvent contain the compound having the sulfonyl group and the carbonyl group, the sulfone compound shown in Chemical formula 1 was more preferable than SBAH.

Examples 4-1 to 4-5

A procedure was performed in the same manner as that of Examples 2-1 to 2-5, except that the anode 34 was formed by the procedure similar to that of Examples 3-1 to 3-19.

Comparative Example 4

A procedure was performed in the same manner as that of Example 4-2, except that the anode 34 was formed by the procedure similar to that of Examples 3-1 to 3-19, and the sulfone compound shown in Chemical formula 2(1) was not contained in the solvent.

For the secondary batteries of Examples 4-1 to 4-5 and Comparative example 4, the storage characteristics and the cycle characteristics were examined. The results shown in Table 6 were obtained. Table 6 also shows respective characteristics of Example 3-2 and Comparative example 3-1.

TABLE 6

| Anode active material: silicon | | | | | | | |
|---|---|---|---|---|---|---|---|
| | | | Solvent | | | Discharge capacity retention ratio (%) | |
| | | | | Sulfone compound | | Storage | Cycle |
| | Electrolyte salt | | Type | Type | wt % | characteristics | characteristics |
| Example 3-2 | $LiPF_6$ 1.0 mol/kg | | EC + DEC | Chemical formula 2(1) | 1 | 80 | 65 |
| Example 4-1 | $LiPF_6$ 0.9 mol/kg | $LiBF_4$ 0.1 mol/kg | | | | 84 | 67 |
| Example 4-2 | Chemical formula 11(6) 0.1 mol/kg | | | | | 83 | 75 |
| Example 4-3 | Chemical formula 12(2) 0.1 mol/kg | | | | | 86 | 80 |
| Example 4-4 | Chemical formula 16(2) 0.1 mol/kg | | | | | 84 | 68 |
| Example 4-5 | $LiPF_6$ 0.8 mol/kg | Chemical formula 11(6) 0.1 mol/kg | Chemical formula 16(2) 0.1 mol/kg | | | 82 | 76 |

TABLE 6-continued

| Anode active material: silicon | | | | | | |
|---|---|---|---|---|---|---|
| | | Solvent | | | Discharge capacity retention ratio (%) | |
| | | | Sulfone compound | | Storage | Cycle |
| | Electrolyte salt | Type | Type | wt % | characteristics | characteristics |
| Comparative example 3-1 | $LiPF_6$ 1.0 mol/kg | EC + DEC | — | — | 70 | 30 |
| Comparative example 4 | $LiPF_6$ 0.9 mol/kg Chemical formula 11(6) 0.1 mol/kg | | | | 75 | 62 |

As shown in Table 6, when silicon was used as the anode active material, results almost similar to the results shown in Table 2 in the case of using artificial graphite were obtained.

That is, in Examples 4-1 to 4-5 in which the solvent contained the sulfone compound shown in Chemical formula 2(1) and the electrolyte salt contained lithium tetrafluoroborate or the like, the discharge capacity retention ratios of the storage characteristics and the cycle characteristics were higher than those in Comparative example 3-1 in which the solvent did not contain the sulfone compound shown in Chemical formula 2(1) and the electrolyte salt did not contain lithium tetrafluoroborate or the like. In Examples 4-1 to 4-5, the discharge capacity retention ratios of the storage characteristics and the cycle characteristics were higher than those in Example 3-2 in which the electrolyte salt did not contain the foregoing lithium tetrafluoroborate or the like. It is needless to say that when the electrolyte salt contained bis[oxalate-O,O']lithium borate, in Example 4-2 in which the solvent contained the sulfone compound shown in Chemical formula 2(1), the discharge capacity retention ratios of the storage characteristics and the cycle characteristics were higher than those in Comparative example 4 in which the solvent did not contain the sulfone compound shown in Chemical formula 2(1). Accordingly, it was confirmed that in the secondary battery in which the solvent of the electrolytic solution contained the sulfone compound shown in Chemical formula 1, the storage characteristics and the cycle characteristics were more improved when the electrolyte salt contained other electrolyte salt together with lithium hexafluorophosphate.

In this case, in particular, in Example 4-5 in which 2 types of other electrolyte salts were added, the discharge capacity retention ratios of the storage characteristics and the cycle characteristics were higher than those in Examples 4-1 to 4-4 in which one type of other electrolyte salt was added. Accordingly, it was confirmed that two or more types of other electrolyte salts were preferably added in order to more improve the storage characteristics and the cycle characteristics.

As evidenced by the foregoing results of Table 1 to Table 4, it was confirmed that when the solvent of the electrolytic solution contained the sulfone compound shown in Chemical formula 1, the storage characteristics and the cycle characteristics were improved regardless of the material used as an anode active material. In particular, it was found that higher effects could be obtained when silicon providing a high energy density was used as an anode active material, since thereby the increase rate of the discharge capacity retention ratios of the storage characteristics and the cycle characteristics were improved. The reason thereof may be as follows. When silicon providing a high energy density or the like was used as an anode active material, the decomposition reaction of the electrolytic solution in the anode 34 was easily generated than in the case of using a carbon material. Thus, when the solvent contained the sulfone compound shown in Chemical formula 1 in this case, the decomposition inhibition effects of the electrolytic solution were significantly demonstrated.

It should be appreciated that the embodiments are not limited to the aspects described in the foregoing embodiment and the foregoing examples, and various modifications may be made. For example, usage applications of the electrolytic solution of the invention are not limited to the battery, but may include other electrochemical devices other than the battery. As other applications, for example, a capacitor and the like can be cited.

In the foregoing embodiment and the foregoing examples, the description has been given of the case using the electrolytic solution or the case using the gel electrolyte in which the electrolytic solution is held by the polymer compound as the electrolyte of the battery. However, other types of electrolyte may be used. As other electrolyte, for example, a mixture of an ion conductive inorganic compound such as ion conductive ceramics, ion conductive glass, and ionic crystal and an electrolytic solution; a mixture of other inorganic compound and an electrolytic solution; a mixture of the foregoing inorganic compound and a gel electrolyte or the like can be cited.

In the foregoing embodiment and the foregoing examples, the description has been given of the lithium ion secondary battery in which the anode capacity is expressed by the capacity component based on insertion and extraction of lithium, or the lithium metal secondary battery in which the lithium metal is used as an anode active material and the anode capacity is expressed by the capacity component based on precipitation and dissolution of lithium as the battery. However, the battery is not limited thereto. The embodiments can be similarly applied to a secondary battery in which the anode capacity includes the capacity component based on insertion and extraction of lithium and the capacity component based on precipitation and dissolution of lithium, and the anode capacity is expressed by the sum of these capacity components, by setting the charge capacity of the anode material capable of inserting and extracting lithium to a smaller value than that of the charge capacity of the cathode.

Further, in the foregoing embodiment and the foregoing examples, the description has been given of the case using lithium as an electrode reactant. However, as an electrode reactant, other Group 1A element such as sodium (Na) and potassium (K), a Group 2A element such as magnesium and calcium (Ca), or other light metal such as aluminum may be used. In this case, the anode material described in the foregoing embodiment can be used as an anode active material as well.

Further, in the foregoing embodiment or the foregoing examples, the description has been given with the specific examples of the cylindrical or laminated film type secondary battery as a battery structure of the battery of the invention. However, the battery can be similarly applied to a secondary battery having other structure such as a coin type battery, a button type battery, and a square battery, or a secondary battery having other structure such as a lamination structure. Further, the battery can be applied to other batteries such as primary batteries in addition to the secondary batteries.

Further, in the foregoing embodiment and the foregoing examples, regarding the content of the sulfone compound shown in Chemical formula 1 in the electrolytic solution, the appropriate range thereof derived from the results of the examples has been described. However, such a description does not totally eliminate the possibility that the content may be out of the foregoing range. That is, the foregoing appropriate range is the range particularly preferable for obtaining the effects. Therefore, as long as effects can be obtained, the content may be out of the foregoing range in some degrees.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electrolytic solution comprising:

a solvent containing a sulfone compound shown in Chemical formula 1

Chemical formula 1

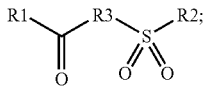

and an electrolyte salt, wherein R1 represents a halogen group, —O—R4, —S—R4, —O—$SiR5_3$, or —S—$SiR5_3$, R2 is a halogen group, —O—R6, —S—R6, —S—$SiR7_3$, or —O—$SiR7_3$, wherein R3 consists of carbon and flourine, wherein R4 and R6 are an alkyl group with the carbon number in the range from 1 to 4 or an alkyl halide group with the carbon number in the range from 1 to 4, wherein R5 and R7 are an alkyl group with the carbon number in the range from 1 to 4, an alkylene group with the carbon number in the range from 1 to 4, or an aryl group, and wherein R4, R6, R5 and R7 may be identical or different.

2. The electrolytic solution according to claim 1, wherein a content of the sulfone compound is in a range from 0.01 wt % to 5 wt %.

3. The electrolytic solution according to claim 1, wherein the solvent contains cyclic ester carbonate having an unsaturated bond.

4. The electrolytic solution according to claim 1, wherein the solvent contains at least one selected from the group consisting of chain ester carbonate having a halogen as an element shown in Chemical formula 2 and cyclic ester carbonate having a halogen as an element shown in Chemical formula 3, Chemical formula 2

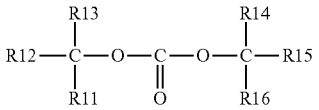

Chemical formula 3

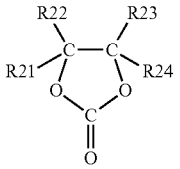

wherein R11 to R16 represent a hydrogen group, a halogen group, an alkyl group, or an alkyl halide group, wherein R11 to R16 may be identical or different, wherein at least one of R11 to R16 is the halogen group or the alkyl halide group, wherein R21 to R24 represent a hydrogen group, a halogen group, an alkyl group, or an alkyl halide group, wherein R21 to R24 may be identical or different, and wherein at least one of R21 to R24 is the halogen group or the alkyl halide group.

5. The electrolytic solution according to claim 4, wherein the cyclic ester carbonate having a halogen as an element includes at least one of 4-fluoro-1,3-dioxolane-2-one and 4,5-difluoro-1,3-dioxolane-2-one.

6. The electrolytic solution according to claim 1, wherein the solvent contains sultone.

7. The electrolytic solution according to claim 1, wherein the solvent contains an acid anhydride.

8. The electrolytic solution according to claim 1, wherein the electrolyte salt contains at least one selected from the group consisting of compounds shown in Chemical formula 4, Chemical formula 5, and Chemical formula 6, Chemical formula 4

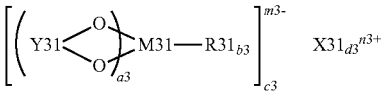

wherein X31 represents a Group 1A element or a Group 2A element in the short period periodic table or aluminum, M31 represents a transition metal, a Group 3B element, a Group 4B element, or a Group 5B element in the short period periodic table, R31 represents a halogen group, Y31 represents —OC—R32-CO—, —OC—$CR33_2$-, or —OC—CO—, R32 represents an alkylene group, an alkylene halide group, an arylene group, or an arylene halide group, R33 represents an alkyl group, an alkyl halide group, an aryl group, or an aryl halide group, and may be identical or different, a3 represents one of integer numbers 1 to 4, b3 represents 0 or an integer number of 2 or 4, and c3, d3, m3, and n3 represent one of integer numbers 1 to 3, Chemical formula 5

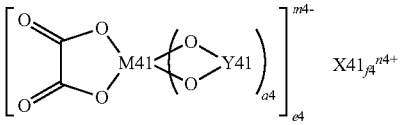

wherein X41 represents a Group 1A element or a Group 2A element in the short period periodic table, M41 represents a transition metal, a Group 3B element, a Group 4B element, or a Group 5B element in the short period periodic table, Y41 represents —OC—$(CR41_2)_{b4}$-CO—, —$R43_2C$—$(CR42_2)_{c4}$-CO—, —$R43_2C$—$(CR42_2)_{c4}$-$CR43_2$-, —$R43_2C$—$(CR42_2)_{c4}$-$SO_2$—, —$O_2S$—$(CR42_2)_{d4}$-$SO_2$—, or —OC—$(CR42_2)_{d4}$-$SO_2$—, R41 and R43 represent a hydrogen group, an alkyl group, a halogen group, or an alkyl halide group, R41 and R43 may be respectively identical or different, at least one of R41 and R43 is respectively the halogen group or the alkyl halide group, R42 represents a hydrogen group, an alkyl group, a halogen group, or an alkyl halide group, and may be identical or different, a4, e4, and n4 represent an integer number of 1 or 2, b4 and d4 represent one of integer numbers 1 to 4, c4 represents 0 or one of integer numbers 1 to 4, and f4 and m4 represent one of integer numbers 1 to 3, and Chemical formula 6

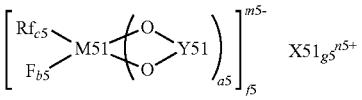

wherein X51 represents a Group 1A element or a Group 2A element in the short period periodic table, M51 represents a transition metal, a Group 3B element, a Group 4B element, or a Group 5B element in the short period periodic table, Rf represents a fluorinated alkyl group with the carbon number in the range from 1 to 10 or a fluorinated aryl group with the carbon number in the range from 1 to 10, Y51 represents —OC—$(CR51_2)_{d5}$-CO—, —$R52_2C$—$(CR51_2)_{d5}$-CO—, —$R52_2C$—$(CR51_2)_{d5}$-$CR52_2$-, —$R52_2C$—$(CR51_2)_{d5}$-$SO_2$—, —$O_2S$—$(CR51_2)_{e5}$-$SO_2$—, or —OC—$(CR51_2)_{e5}$-$SO_2$—, R51 represents a hydrogen group; an alkyl group, a halogen group, or an alkyl halide group, and may be identical or different, R52 represents a hydrogen group, an alkyl group, a halogen group, or an alkyl halide group, may be identical or different, but at least one thereof is the halogen group or the alkyl halide group, a5, f5, and n5represent an integer number of 1 or 2, b5, c5, and e5 represent one of integer numbers 1 to 4, d5 represents 0 or one of integer numbers 1 to 4, and g5 and m5 represent one of integer numbers 1 to 3.

9. The electrolytic solution according to claim 8, wherein:

wherein the compound shown in Chemical formula 4 includes at least one selected from the group consisting of difluoro[oxalate-O,O']lithium borate in Chemical formula 7(1), difluorobis[oxalate-O,O']lithium phosphate in Chemical formula 7(2), difluoro[3,3,3-trifluoro-2-oxide-2-trifluoromethyl propionate(2-)-O,O']lithium borate in Chemical formula 7(3), bis[3,3,3-trifluoro-2-oxide-2-trifluoromethyl propionate(2-)—O,O']lithium borate in Chemical formula 7(4), tetrafluoro[oxalate-O, O']lithium phosphate in Chemical formula 7(5), and bis[oxalate-O, O']lithium borate in Chemical formula 7(6);

wherein the compound shown in Chemical formula 5 includes at least one selected from the group consisting of (2,2-difluoromalonate oxalate)lithium borate in Chemical formula 8(1), [bis(3,3,3-trifluoromethyl)glycolate oxalate]lithium borate in Chemical formula 8(2), (3,3,3-trifluoromethyl propionate oxalate)lithium borate in Chemical formula 8(3), (2-trifluoromethyl propionate oxalate)lithium borate in Chemical formula 8(4), (4,4,4-trifluoro-3-trifluoromethyl butyric acid oxalate)lithium borate in Chemical formula 8(5), (perfluoropinacolate oxalate)lithium borate in Chemical formula 8(6), (4,4,4-trifluoro-3-methyl butyric acid oxalate)lithium borate in Chemical formula 8(7), and (4,4,4-trifluorobutyric acid oxalate)lithium borate in Chemical formula 8(8); and the compound shown in Chemical formula 6 includes fluorotrifluoromethyl[oxalate-O, O']lithium borate in Chemical formula 8(9), Chemical formula 7

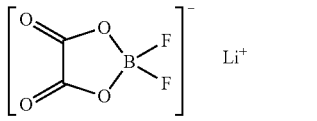

(1)

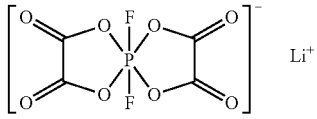

(2)

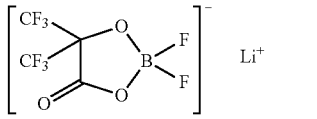

(3)

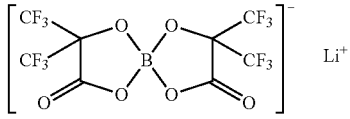

(4)

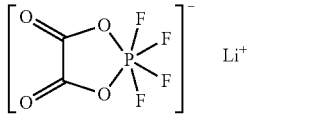

(5)

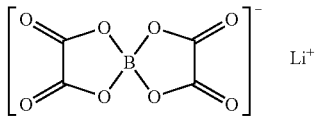

(6)

-continued

Chemical formula 8

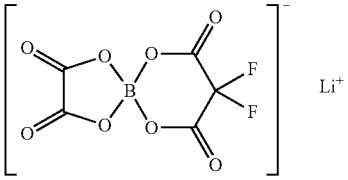

(1)

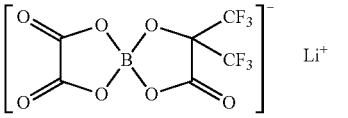

(2)

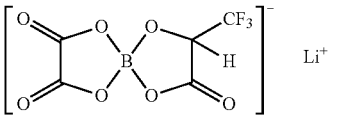

(3)

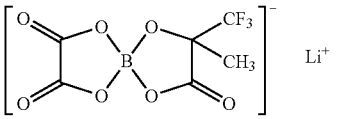

(4)

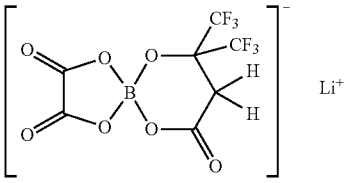

(5)

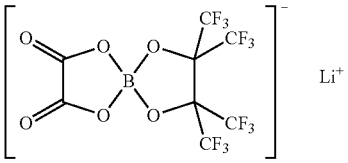

(6)

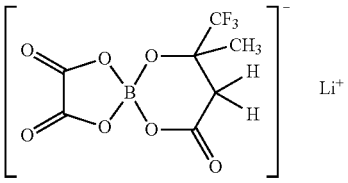

(7)

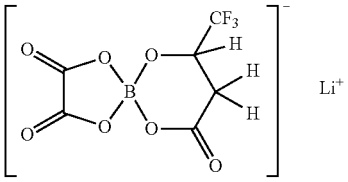

(8)

-continued

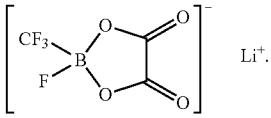

(9)

10. The electrolytic solution according to claim 1, wherein the electrolyte salt contains at least one selected from the group consisting of lithium hexafluorophosphate, lithium tetrafluoroborate, lithium perchlorate, lithium hexafluoroarsenate, and compounds shown in Chemical formula 9, Chemical formula 10, and Chemical formula 11, $$LiN(C_mF_{2m+1}SO_2)(C_nF_{2n+1}SO_2)$$ Chemical formula 9 wherein m and n represent an integer number of 1 or more, and m and n may be identical or different, Chemical formula 10

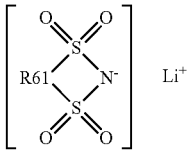

wherein R61 represents a straight chain or branched perfluoro alkylene group with the carbon number in the range from 2 to 4, and $$LiC(C_pF_{2p+1}SO_2)(C_qF_{2q+1}SO_2)(C_rF_{2r+1}SO_2)$$ Chemical formula 11 wherein p, q, and r represent an integer number of 1 or more, and p, q, and r may be identical or different.

11. A battery comprising:

a cathode;

an anode; and an electrolytic solution, wherein the electrolytic solution contains a solvent containing a sulfone compound shown in Chemical formula 12 and an electrolyte salt, Chemical formula 12

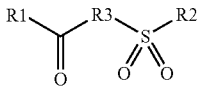

wherein R1 represents a halogen group, —O—R4, —S—R4, —O—$SiR5_3$, or —S—$SiR5_3$, R2 is a halogen group, —O—R6, —S—R6, —S—$SiR7_3$, or —O—$SiR7_3$, R3 consists of carbon and flourine, R4 and R6 are an alkyl group with the carbon number in the range from 1 to 4 or an alkyl halide group with the carbon number in the range from 1 to 4, R5 and R7 are an alkyl group with the carbon number in the range from 1 to 4, an alkylene group with the carbon number in the range from 1 to 4, or an aryl group, and R4 , R6 , R5 and R7 may be identical or different.

12. The battery according to claim 11, wherein a content of the sulfone compound in the electrolytic solution is in a range from 0.01 wt % to 5 wt %.

13. The battery according to claim 11, wherein the solvent contains cyclic ester carbonate having an unsaturated bond.

14. The battery according to claim 11, wherein the solvent contains at least one selected from the group consisting of chain ester carbonate having a halogen as an element shown in Chemical formula 13 and cyclic ester carbonate having a halogen as an element shown in Chemical formula 14, Chemical formula 13

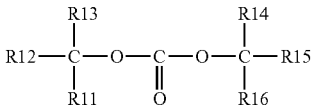

wherein R11 to R16 represent a hydrogen group, a halogen group, an alkyl group, or an alkyl halide group, R11 to R16 may be identical or different, and at least one of R11 to R16 is the halogen group or the alkyl halide group, and Chemical formula 14

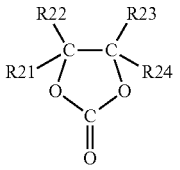

wherein R21 to R24 represent a hydrogen group, a halogen group, an alkyl group, or an alkyl halide group, R21 to R24 may be identical or different, and at least one of R21 to R24 is the halogen group or the alkyl halide group.

15. The battery according to claim 14, wherein the cyclic ester carbonate having a halogen as an element includes at least one of 4-fluoro-1,3-dioxolane-2-one and 4,5-difluoro-1,3-dioxolane-2-one.

16. The battery according to claim 11, wherein the solvent contains sultone.

17. The battery according to claim 11, wherein the solvent contains an acid anhydride.

18. The battery according to claim 11, wherein the electrolyte salt contains at least one selected from the group consisting of compounds shown in Chemical formula 15, Chemical formula 16, and Chemical formula 17, Chemical formula 15

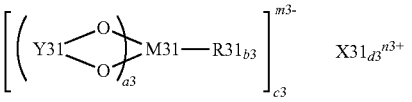

wherein X31 represents a Group 1A element or a Group 2A element in the short period periodic table or aluminum, M31 represents a transition metal, a Group 3B element, a Group 4B element, or a Group 5B element in the short period periodic table, R31 represents a halogen group, Y31 represents —OC—R32-CO—, —OC—$CR33_2$-, or —OC—CO—, R32 represents an alkylene group, an alkylene halide group, an arylene group, or an arylene halide group, R33 represents an alkyl group, an alkyl halide group, an aryl group, or an aryl halide group, and may be identical or different, a3 represents one of integer numbers 1 to 4, b3 represents 0 or an integer number of 2 or 4, and c3, d3, m3, and n3 represent one of integer numbers 1 to 3, Chemical formula 16

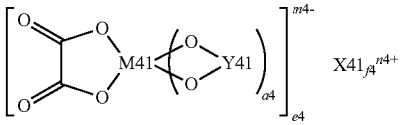

wherein X41 represents a Group 1A element or a Group 2A element in the short period periodic table, M41 represents a transition metal, a Group 3B element, a Group 4B element, or a Group 5B element in the short period periodic table, Y41 represents —OC—$(CR41_2)_{b4}$-CO—, —$R43_2C$—$(CR42_2)_{c4}$-CO—, —$R43_2C$—$(CR42_2)_{c4}$-$CR43_2$-, —$R43_2C$—$(CR42_2)_{c4}$-$SO_2$—, —$O_2S$—$(CR42_2)_{d4}$-$SO_2$—, or —OC—$(CR42_2)_{d4}$-$SO_2$—, R41 and R43 represent a hydrogen group, an alkyl group, a halogen group, or an alkyl halide group, R41 and R43 may be respectively identical or different, at least one of R41 and R43 is respectively the halogen group or the alkyl halide group, R42 represents a hydrogen group, an alkyl group, a halogen group, or an alkyl halide group, and may be identical or different, a4, e4, and n4 represent an integer number of 1 or 2, b4 and d4 represent one of integer numbers 1 to 4, c4 represents 0 or one of integer numbers 1 to 4, f4 and m4 represent one of integer numbers 1 to 3, and Chemical formula 17

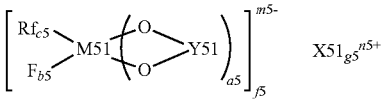

wherein X51 represents a Group 1A element or a Group 2A element in the short period periodic table, M51 represents a transition metal, a Group 3B element, a Group 4B element, or a Group 5B element in the short period periodic table, Rf represents a fluorinated alkyl group with the carbon number in the range from 1 to 10 or a fluorinated aryl group with the carbon number in the range from 1 to 10, Y51 represents —OC—$(CR51_2)_{d5}$-CO—, —$R52_2C$—$(CR51_2)_{d5}$-CO—, —$R52_2C$—$(CR51_2)_{d5}$-$CR52_2$-, —$R52_2C$—$(CR51_2)_{d5}$-$SO_2$—, —$O_2S$—$(CR51_2)_{e5}$-$SO_2$—, or —OC—$(CR51_2)_{e5}$-$SO_2$—, R51 represents a hydrogen group, an alkyl group, a halogen group, or an alkyl halide group, and may be identical or different, R52 represents a hydrogen group, an alkyl group, a halogen group, or an alkyl halide group, may be identical or different, but at least one thereof is the halogen group or the alkyl halide group, a5, f5, and n5 represent an integer number of 1 or 2, b5, c5, and e5 represent one of integer numbers 1 to 4, d5 represents 0 or one of integer numbers 1 to 4, and g5 and m5 represent one of integer numbers 1 to 3.

19. The battery according to claim 18, wherein:

the compound shown in Chemical formula 15 includes at least one selected from the group consisting of difluoro[oxalate-O,O']lithium borate in Chemical formula 18(1), difluorobis[oxalate-O,O']lithium phosphate in Chemical formula 18(2), difluoro[3,3,3-trifluoro-2-oxide-2-trifluoromethyl propionate(2-)-O,O']lithium borate in Chemical formula 18(3), bis[3,3,3-trifluoro-2-oxide-2-trifluoromethyl propionate(2)-O,O']lithium borate in Chemical formula 18(4), tetrafluoro[oxalate-O,O']lithium phosphate in Chemical formula 18(5), and bis[oxalate-O,O']lithium borate in Chemical formula 18(6);

the compound shown in Chemical formula 16 includes at least one selected from the group consisting of (2,2-difluoromalonate oxalate)lithium borate in Chemical formula 19(1), [bis(3,3,3-trifluoromethyl)glycolate oxalate]lithium borate in Chemical formula 19(2), (3,3,3-trifluoromethyl propionate oxalate)lithium borate in Chemical formula 19(3), (2-trifluoromethyl propionate oxalate)lithium borate in Chemical formula 19(4), (4,4,4-trifluoro-3-trifluoromethyl butyric acid oxalate) lithium borate in Chemical formula 19(5), (perfluoropinacolate oxalate)lithium borate in Chemical formula 19(6), (4,4,4-trifluoro-3-methyl butyric acid oxalate) lithium borate in Chemical formula 19(7), and (4,4,4-trifluorobutyric acid oxalate)lithium borate in Chemical formula 19(8); and the compound shown in Chemical formula 17 includes fluorotrifluoromethyl[oxalate-O,O']lithium borate in Chemical formula 19(9), Chemical formula 18

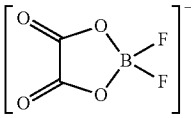

(1)

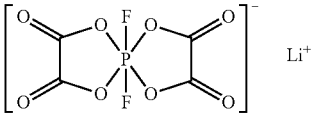

(2)

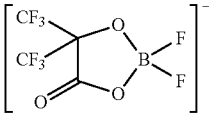

(3)

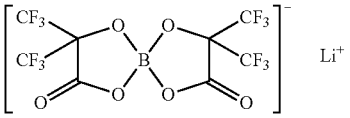

(4)

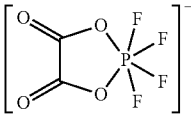

(5)

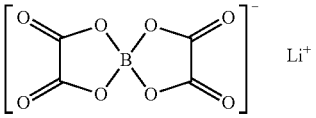

(6)

Chemical formula 19

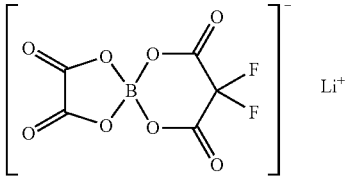

(1)

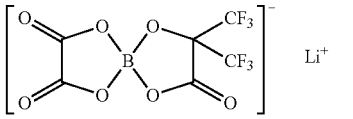

(2)

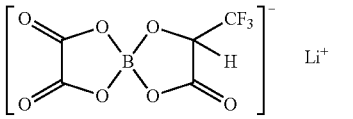

(3)

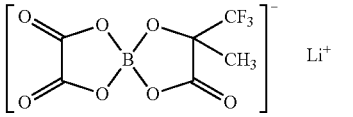

(4)

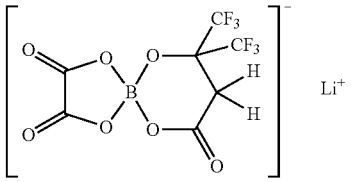

(5)

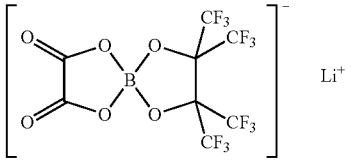

(6)

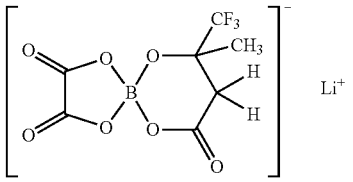

(7)

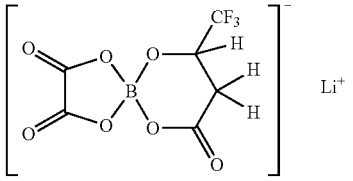

(8)

-continued

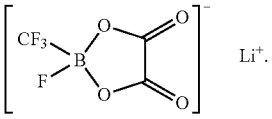

(9)

20. The battery according to claim 11, wherein the electrolyte salt contains at least one selected from the group consisting of lithium hexafluorophosphate, lithium tetrafluoroborate, lithium perchlorate, lithium hexafluoroarsenate, and compounds shown in Chemical formula 20, Chemical formula 2(1), and Chemical formula 22, $LiN(C_mF_{2m+1}SO_2)(C_nF_{2n+1}SO_2)$ Chemical formula 20 wherein m and n represent an integer number of 1 or more, and m and n may be identical or different, Chemical formula 21

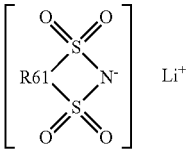

wherein R61 represents a straight chain or branched perfluoro alkylene group with the carbon number in the range from 2 to 4, and $LiC(C_pF_{2p+1\ SO2})(C_qF_{2q+1}SO_2)(C_rF_{2r+1}SO_2)$ Chemical formula 22 wherein p, q, and r represent an integer number of 1 or more, and p, q, and r may be identical or different.

21. The battery according to claim 11, wherein the anode contains a carbon material, lithium metal, or a material containing at least one selected from the group consisting of silicon and tin as an element.

22. The battery according to claim 11, wherein the anode contains at least one selected from the group consisting of a simple substance of silicon, an alloy of silicon, a compound of silicon and a simple substance of tin, an alloy of tin, and a compound of tin.

23. The battery according to claim 11, wherein the anode comprises:

an anode current collector; and an anode active material layer provided on the anode current collector, wherein the anode active material layer is formed by at least one method selected from the group consisting of vapor-phase deposition method, liquid phase deposition method, and firing method.

*24. An electrolytic solution comprising:*

*a solvent containing a sulfone compound shown in Chemical formula 1 Chemical formula 1; and*

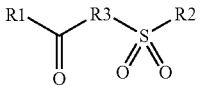

*an electrolyte salt,*

*wherein R1 represents a halogen group, —O—R4, —S—R4, —O—SiR5$_3$, or —S—SiR5$_3$, R2 is a halogen group, —O—R6, —S—R6, —S—SiR7$_3$, or —O—SiR7$_3$, wherein R3 comprises carbon, wherein R4 and R6 are an alkyl group with the carbon number in the range from 1 to 4 or an alkyl halide group with the carbon number in the range from 1 to 4, wherein R5 and R7 are an alkyl group with the carbon number in the range from 1 to 4, an alkylene group with the carbon number in the range from 1 to 4, or an aryl group, and wherein R4, R6, R5 and R7 may be identical or different.*

*25. The electrolyte solution according to claim 24, wherein R3 further comprises at least one selected from the group consisting of hydrogen, oxygen and a halogen.*

*26. The electrolyte solution according to claim 25, wherein R3 is selected from the group consisting of —CH$_2$—, —CHF—, —CF$_2$—, —C≡C—, —CH$_2$—CH$_2$—, —CF$_2$—CF$_2$—, —CH$_2$—O—CH$_2$—, —CF$_2$—CH$_2$—CF$_2$—, —CH$_2$—CH$_2$—CH$_2$—, —CF$_2$—CF$_2$—CF$_2$—, —CH$_2$—CH$_2$—CH$_2$—CH$_2$—, —CF$_2$—CH$_2$—CH$_2$—CF$_2$—, —CF$_2$—CF$_2$—CF$_2$—CF$_2$—, —C(CH$_3$)$_2$—, —C(C$_2$H$_5$)$_2$—, —C(C$_3$H$_7$)$_2$—, —C(CH$_3$)$_2$—C(CH$_3$)$_2$—, —CH$_2$—CH$_2$—C(CH$_3$)$_2$—, —CF$_2$—CH$_2$—C(CH$_3$)$_2$—, —C(CH$_3$)$_2$—CH$_2$—C(CH$_3$)$_2$—, —C(C$_6$H$_5$)$_2$—C(C$_6$H$_5$)$_2$—, —CF$_2$—CH$_2$—C(C$_6$H$_5$)$_2$—, —C(C$_6$H$_5$)$_2$—CH$_2$—C(C$_6$H$_5$)$_2$—.*

*27. The electrolyte solution according to claim 24, wherein R3 further comprises hydrogen.*

*28. The electrolyte solution according to claim 27, wherein R3 is selected from the group consisting of —CH$_2$—, —CHF—, —CH$_2$—CH$_2$—, —CH$_2$—O—CH$_2$—, —CF$_2$—CH$_2$—CF$_2$—, —CH$_2$—CH$_2$—CH$_2$—, —CH$_2$—CH$_2$—CH$_2$—CH$_2$—, —CF$_2$—CH$_2$—CH$_2$—CF$_2$—, —C(CH$_3$)$_2$—, —C(C$_2$H$_5$)$_2$—, —C(C$_3$H$_7$)$_2$—, —C(CH$_3$)$_2$—C(CH$_3$)$_2$—, —CH$_2$—CH$_2$—C(CH$_3$)$_2$—, —CF$_2$—CH$_2$—C(CH$_3$)$_2$—, —C(CH$_3$)$_2$—CH$_2$—C(CH$_3$)$_2$—, —C(C$_6$H$_5$)$_2$—C(C$_6$H$_5$)$_2$—, —CF$_2$—CH$_2$—C(C$_6$H$_5$)$_2$—, —C(C$_6$H$_5$)$_2$—CH$_2$—C(C$_6$H$_5$)$_2$—.*

*29. The electrolyte solution according to claim 24, wherein R3 is —C≡C—.*

*30. The electrolyte solution according to claim 24, wherein R3 further comprises a halogen.*

*31. The electrolyte solution according to claim 30, wherein R3 is selected from the group consisting of —CHF—, —CF$_2$—, —CF$_2$—CF$_2$—, —CF$_2$—CH$_2$—CF$_2$—, —CF$_2$—CF$_2$—CF$_2$—, —CF$_2$—CH$_2$—CH$_2$—CF$_2$—, —CF$_2$—CF$_2$—CF$_2$—CF$_2$—, —CF$_2$—CH$_2$—C(CH$_3$)$_2$—, —CF$_2$—CH$_2$—C(C$_6$H$_5$)$_2$—.*

*32. The electrolyte solution according to claim 24, wherein R3 further comprises oxygen.*

*33. The electrolyte solution according to claim 32, wherein R3 is —CH$_2$—O—CH$_2$—.*

*34. A battery comprising:*

*a cathode;*

*an anode; and*

*an electrolytic solution, wherein the electrolytic solution contains a solvent containing a sulfone compound shown in Chemical formula 12 and an electrolyte salt,*

Chemical formula 12

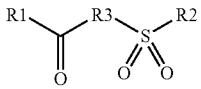

*wherein R1 represents a halogen group, —O—R4, —S—R4, —O—SiR5$_3$, or —S—SiR5$_3$, R2 is a halogen group, —O—R6, —S—R6, —S—SiR7$_3$, or —O—SiR7$_3$, wherein R3 comprises carbon, R4 and R6 are an alkyl group with the carbon number in the range from 1 to 4 or*

*an alkyl halide group with the carbon number in the range from 1 to 4, R5 and R7 are an alkyl group with the carbon number in the range from 1 to 4, an alkylene group with the carbon number in the range from 1 to 4, or an aryl group, and R4, R6, R5 and R7 may be identical or different.*

*35. The battery according to claim 34, wherein R3 further comprises at least one selected from the group consisting of hydrogen, oxygen and a halogen.*

*36. The battery according to claim 35, wherein R3 is selected from the group consisting of* $—CH_2—$, $—CHF—$, $—CF_2—$, $—C{\equiv}C—$, $—CH_2—CH_2—$, $—CF_2—CF_2—$, $—CH_2—O—CH_2—$, $—CF_2—CH_2—CF_2—$, $—CH_2—CH_2—CH_2—$, $—CF_2—CF_2—CF_2—$, $—CH_2—CH_2—CH_2—CH_2—$, $—CF_2—CH_2—CH_2—CF_2—$, $—CF_2—CF_2—CF_2—CF_2—$, $—C(CH_3)_2—$, $—C(C_2H_5)_2—$, $—C(C_3H_7)_2—$, $—C(CH_3)_2—C(CH_3)_2—$, $—CH_2—CH_2—C(CH_3)_2—$, $—CF_2—CH_2—C(CH_3)_2—$, $—C(CH_3)_2—CH_2—C(CH_3)_2—$, $—C(C_6H_5)_2—C(C_6H_5)_2—$, $—CF_2—CH_2—C(C_6H_5)_2—$, $—C(C_6H_5)_2—CH_2—C(C_6H_5)_2—$.

*37. The battery according to claim 34, wherein R3 further comprises hydrogen.*

*38. The battery according to claim 37, wherein R3 is selected from the group consisting of* $—CH_2—$, $—CHF—$, $—CH_2—CH_2—$, $—CH_2—O—CH_2—$, $—CF_2—CH_2—CF_2—$, $—CH_2—CH_2—CH_2—$, $—CH_2—CH_2—CH_2—CH_2—$, $—CF_2—CH_2—CH_2—CF_2—$, $—C(CH_3)_2—$, $—C(C_2H_5)_2—$, $—C(C_3H_7)_2—$, $—C(CH_3)_2—C(CH_3)_2—$, $—CH_2—CH_2—C(CH_3)_2—$, $—CF_2—CH_2—C(CH_3)_2—$, $—C(CH_3)_2—CH_2—C(CH_3)_2—$, $—C(C_6H_5)_2—C(C_6H_5)_2—$, $—CF_2—CH_2—C(C_6H_5)_2—$, $—C(C_6H_5)_2—CH_2—C(C_6H_5)_2—$.

*39. The battery according to claim 34, wherein R3 is* $—C{\equiv}C—$.

*40. The battery according to claim 34, wherein R3 further comprises a halogen.*

*41. The battery according to claim 40, wherein R3 is selected from the group consisting of* $—CHF—$, $—CF_2—$, $—CF_2—CF_2—$, $—CF_2—CH_2—CF_2—$, $—CF_2—CF_2—CF_2—$, $—CF_2—CH_2—CH_2—CF_2—$, $—CF_2—CF_2—CF_2—CF_2—$, $—CF_2—CH_2—C(CH_3)_2—$, $—CF_2—CH_2—C(C_6H_5)_2—$.

*42. The battery according to claim 34, wherein R3 further comprises oxygen.*

*43. The battery according to claim 42, wherein R3 is* $—CH_2—O—CH_2—$.

* * * * *